(12) United States Patent
Gan et al.

(10) Patent No.: US 10,157,581 B2
(45) Date of Patent: Dec. 18, 2018

(54) IMAGE DISPLAY MEDIUM DRIVING DEVICE, IMAGE DISPLAY APPARATUS, DRIVING PROGRAM, AND COMPUTER-READABLE MEDIUM

(71) Applicant: E Ink Corporation, Billerica, MA (US)

(72) Inventors: Taijyu Gan, Minamiashigara (JP); Ryota Mizutani, Minamiashigara (JP); Yasufumi Suwabe, Minamiashigara (JP); Yoshinori Machida, Minamiashigara (JP); Naoki Hiji, Ebina (JP)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/689,199

(22) Filed: Aug. 29, 2017

(65) Prior Publication Data
US 2017/0358263 A1    Dec. 14, 2017

Related U.S. Application Data

(62) Division of application No. 14/386,129, filed as application No. PCT/JP2013/065212 on May 31, 2013, now Pat. No. 9,779,671.

(30) Foreign Application Priority Data

May 31, 2012  (JP) .................................. 2012-124332
Mar. 13, 2013  (JP) .................................. 2013-050392

(51) Int. Cl.
*G02F 1/23*    (2006.01)
*G02F 1/167*   (2006.01)
(Continued)

(52) U.S. Cl.
CPC ........... *G09G 3/344* (2013.01); *G02F 1/0121* (2013.01); *G02F 1/167* (2013.01); *G09G 3/2003* (2013.01);
(Continued)

(58) Field of Classification Search
CPC ....... G09G 2320/04; G09G 2320/0242; G09G 2320/0276; G09G 2320/0271;
(Continued)

(56) References Cited

U.S. PATENT DOCUMENTS 6,333,754 B1   12/2001  Oba et al.
6,407,763 B1    6/2002  Yamaguchi
(Continued)

FOREIGN PATENT DOCUMENTS

EP    1462847 A1    9/2004
JP    2000194021 A   7/2000
(Continued)

OTHER PUBLICATIONS

Japanese Patent Office; International Search Report and Written Opinion—English translation; PCT/JP2013/065212; dated Sep. 3, 2013, dated Sep. 3, 2013.

*Primary Examiner* — Julie Anne Watko
(74) *Attorney, Agent, or Firm* — Antranig Baronian

(57) ABSTRACT

A image display medium driving device includes a voltage application unit that applies a voltage between a pair of substrates, at least one of which is transparent, of an image display medium including plural types of particles which are sealed between the pair of substrates, are attached to the substrates, and start to be separated from the substrates at different times when a predetermined voltage is applied and a control unit that controls the voltage application unit such that a time when the voltage is applied between the pair of substrates varies depending on image information.

9 Claims, 30 Drawing Sheets

(51) Int. Cl.
*G02F 1/01* (2006.01)
*G09G 3/34* (2006.01)
*G09G 3/20* (2006.01)

(52) U.S. Cl.
CPC ............. *G09G 3/2014* (2013.01); *G02F 1/23* (2013.01); *G09G 3/2007* (2013.01); *G09G 2310/0289* (2013.01); *G09G 2310/06* (2013.01); *G09G 2310/068* (2013.01); *G09G 2310/08* (2013.01); *G09G 2320/0242* (2013.01); *G09G 2320/0252* (2013.01); *G09G 2320/04* (2013.01)

(58) Field of Classification Search
CPC ....... G09G 2320/0252; G09G 2310/08; G09G 2310/068; G09G 2310/063; G09G 2310/061; G09G 2310/06; G09G 2310/0289; G09G 3/2062; G09G 3/2059; G09G 3/344; G09G 3/2003; G09G 3/20; G09G 3/2014; G09G 3/2007; G02F 1/00; G02F 1/01; G02F 1/167; G02F 1/1674; G02F 1/1678; G02F 1/23; G02F 1/0121
See application file for complete search history.

(56) References Cited

U.S. PATENT DOCUMENTS

| | | |
|---|---|---|
| 6,531,997 B1 | 3/2003 | Gates |
| 6,636,186 B1 | 10/2003 | Yamaguchi |
| 6,650,462 B2 | 11/2003 | Katase |
| 6,866,356 B2 | 3/2005 | Usuda et al. |
| 6,956,557 B2 | 10/2005 | Machida |
| 7,050,040 B2 | 5/2006 | Daniel |
| 7,236,291 B2 | 6/2007 | Kaga et al. |
| 7,321,459 B2 | 1/2008 | Masuda et al. |
| 7,342,556 B2 | 3/2008 | Oue |
| 7,369,299 B2 | 5/2008 | Sakurai et al. |
| 7,372,434 B2 | 5/2008 | Kang et al. |
| 7,495,819 B2 | 2/2009 | Sakurai et al. |
| 7,602,374 B2 | 10/2009 | Zehner |
| 7,646,530 B2 | 1/2010 | Takagi et al. |
| 7,705,823 B2 | 4/2010 | Nihei |
| 8,094,099 B2 | 1/2012 | Uchino et al. |
| 8,164,557 B2 | 4/2012 | Kubota et al. |
| 8,223,177 B2 | 7/2012 | Nathan et al. |
| 8,274,079 B2 | 9/2012 | Yamazaki |
| 8,643,939 B2 | 2/2014 | Hayashi |
| 8,941,583 B2 | 1/2015 | Campisi |
| 9,129,566 B2 | 9/2015 | Shigehiro |
| 9,412,314 B2 | 8/2016 | Amundson |
| 2005/0168799 A1* | 8/2005 | Whitesides ............ B82Y 30/00 359/296 |
| 2005/0248696 A1* | 11/2005 | Miller ...................... B01J 13/10 349/86 |
| 2005/0280626 A1* | 12/2005 | Amundson ............ G09G 3/344 345/107 |
| 2006/0087479 A1 | 4/2006 | Sakurai et al. |
| 2006/0087489 A1 | 4/2006 | Sakurai et al. |
| 2006/0209008 A1 | 9/2006 | Nihei et al. |
| 2006/0214906 A1 | 9/2006 | Kobayashi et al. |
| 2007/0080928 A1* | 4/2007 | Ishii ........................ G04G 9/12 345/107 |
| 2010/0277456 A1 | 11/2010 | Yamada |

FOREIGN PATENT DOCUMENTS

| | | |
|---|---|---|
| JP | 2001290178 A | 10/2001 |
| JP | 2008176017 A | 7/2008 |
| JP | 2009244635 A | 10/2009 |
| JP | 2010262309 A | 11/2010 |
| KR | 101392583 B1 | 5/2014 |
| WO | 2004079442 A1 | 9/2004 |
| WO | 2011077668 A1 | 6/2011 |

* cited by examiner

IMAGE DISPLAY MEDIUM DRIVING DEVICE, IMAGE DISPLAY APPARATUS, DRIVING PROGRAM, AND COMPUTER-READABLE MEDIUM

CROSS-REFERENCE TO RELATED APPLICATIONS

This application is a divisional of U.S. application Ser. No. 14/386,129, filed Sep. 18, 2014, which is a National Stage Entry of International Application PCT/JP2013/065212, filed on May 31, 2013; which claims the benefit of and priority to Japanese Patent Application No. 2012-124332, filed May 31, 2012, and Japanese Patent Application No. 2013-050392, filed Mar. 13, 2013. The above-identified applications are incorporated herein by reference in their entireties.

TECHNICAL FIELD

The present invention relates to an image display medium driving device, an image display apparatus, a driving program, and a computer-readable medium.

BACKGROUND ART

An image display medium using colored particles has been known as a rewritable image display medium having a memory property. The image display medium includes, for example, a pair of substrates and plural types of particle groups which are sealed between the substrates so as to be movable between the substrates by an applied electric field and have different colors and charging characteristics.

The image display medium applies a voltage corresponding to an image between the pair of substrates to move the particles and displays an image using the contrast of the particles with different colors. In addition, even after the image is displayed and the application of the voltage is stopped, the display of the image is maintained.

For example, techniques disclosed in Patent Literature 1 and Patent Literature 2 have been proposed as the image display medium.

Patent Literature 1 discloses a display device that includes a display medium including a black-colored dispersion medium and colored electrophoretic particles which are dispersed in the dispersion medium, have different colors, and have different electrophoretic mobilities and applies electric fields with different intensities to the display medium in different directions for different times to display different colors.

Patent Literature 2 discloses the technique that encloses plural types of particle groups, which have different adhesive forces to a display substrate and a rear substrate, that is, different electric field intensities for starting the movement of the particles, in a dispersion medium provided between the display substrate and the rear substrate, forms an electric field with electric field intensity for starting the movement of each type of particle group according to each type of particle group to selectively move desired particles, suppresses the movement of particles of colors other than the desired color in the dispersion medium, and suppresses the mixture of the colors other than the desired color.

CITATION LIST

Patent Literature

Patent Literature 1: JP-A-2000-194021
Patent Literature 2: JP-A-2007-249188

SUMMARY OF INVENTION

Technical Problem

An object of the invention is to improve the controllability of particles, as compared to a structure which controls the level of a voltage to drive particles.

ADVANTAGEOUS EFFECTS OF INVENTION

Solution to Problem (1) According to an aspect of the invention, it is an image display medium driving device including: a voltage application unit that applies a voltage between a pair of substrates, at least one of which is transparent, of an image display medium including plural types of particles which are sealed between the pair of substrates, are attached to the substrates, and start to be separated from the substrates at different times when a predetermined voltage is applied; and a control unit that controls the voltage application unit such that a time when the voltage is applied between the pair of substrates varies depending on image information.

(2) According to another aspect of the invention, it is an image display medium driving device including: a voltage application unit that applies a voltage between a pair of substrates, at least one of which is transparent, of an image display medium which displays an image on the basis of image information and includes plural types of particles that are sealed between the pair of substrates, have different colors, have different adhesive forces for maintaining attachment to the substrates, and require different voltages to be separated from the substrates in an attached state; and a control unit that controls the voltage application unit such that a voltage with a level to separate particles, which have the highest adhesive force among the plural types of particles and are attached to one of the substrates, from the substrate is applied between the pair of substrates for an application time corresponding to the adhesive force of the particles to be separated from the substrate on the basis of the image information.

(3) It is the image display medium driving device according to (2), in which the control unit controls the voltage application unit such that a voltage, which has a level to separate the particles with the highest adhesive force among the plural types of particles from the substrate and has a duration for which at least some of the particles to be separated from the substrate are separated from the substrate as the application time, is applied between the pair of substrates on the basis of the image information.

(4) It is the image display medium driving device according to (2), in which the control unit controls the voltage application unit such that a voltage, which has a level to separate the particles with the highest adhesive force among the plural types of particles from the substrate and has a duration for which at least some of the particles with the highest adhesive force are separated from the substrate as the application time, is applied and then voltages whose application time and polarity are sequentially changed in descending order of the adhesive force depending on the adhesive force are applied between the pair of substrates on the basis of the image information.

(5) According to another aspect of the invention, it is an image display medium driving device including: a voltage application unit that applies a voltage between a pair of substrates, at least one of which is transparent, of an image display medium which displays an image on the basis of image information and includes particles that are sealed between the pair of substrates, have charging characteristics, are attached to the substrate, and are separated from the substrate by the voltage applied between the substrate; and a control unit that controls the voltage application unit such that a voltage, which has a level that is required for the particles attached to the substrate to be separated from the substrate and is equal to or greater than the adhesive force and a duration for which at least some of the particles are separated from the substrate, is applied between the pair of substrates on the basis of the image information.

(6) It is the image display medium driving device according to any one of (1) to (5), in which the plural types of particles each have a separation time distribution from the start of the separation of the particles from the substrate to the end of the separation of all of the particles from the substrate and are separated from the substrate according to the separation time distribution.

(7) It is the image display medium driving device according to (6), in which in the separation time distribution of each of the plural types of particles, a time when predetermined A % (A>50) of particles that have a short separation start time from the substrate after the voltage starts to be applied are separated from the substrate is shorter than a time when (100−A)% of particles that have a long separation start time from the substrate after the voltage starts to be applied are separated from the substrate.

(8) It is the image display medium driving device according to (6) or (7), in which, among the plural types of particles, the diameter×charge density of the particle that has the short separation start time from the substrate is greater than that of the particle that has the long separation start time from the substrate.

(9) According to another aspect of the invention, it is an image display apparatus including: the image display medium; and the image display medium driving device according to (1).

(10) According to another aspect of the invention, it is an image display apparatus including: the image display medium; and the image display medium driving device according to any one of (2) to (4).

(11) According to another aspect of the invention, it is an image display apparatus including: the image display medium; and the image display medium driving device according to (5).

(12) According to another aspect of the invention, it is a driving program that causes a computer to function as the control unit of the image display medium driving device according to any one of (1) to (8).

(13) According to another aspect of the invention, it is a non-transitory computer-readable medium storing a driving program that causes a computer to function as the control unit of the image display medium driving device according to any one of (1) to (8).

Advantageous Effects of Invention

According to the configuration described in (1), it is possible to provide an image display medium driving device which can improve the controllability of particles, as compared to a configuration which controls the level of a voltage to drive particles.

According to the configuration described in (2), it is possible to provide an image display medium driving device which can improve the controllability of particles, as compared to a configuration which controls the level of a voltage to drive particles.

According to the configuration described in (3), it is possible to perform the gradation display of the particles to be separated from the substrate.

According to the configuration described in (4), it is possible to selectively drive plural types of particles.

According to the configuration described in (5), it is possible to provide an image display apparatus driving device which can reduce an image rewriting time, as compared to a configuration which controls the level of a voltage to drive particles.

According to the configuration described in (6), it is possible to improve the controllability of particles, as compared to a configuration without a separation time distribution.

According to the configuration described in (7), it is possible to obtain a clear image without color mixture, as compared to a case in which this configuration is not applied.

According to the configuration described in (8), it is possible to prevent a particle which is separated from the substrate later from overtaking a particle which is previously separated from the substrate.

According to the configuration described in (9), it is possible to provide an image display apparatus which can improve the controllability of particles, as compared to a configuration which controls the level of a voltage to drive particles.

According to the configuration described in (10), it is possible to provide an image display apparatus which can improve the controllability of particles, as compared to a configuration which controls the level of a voltage to drive particles.

According to the configuration described in (11), it is possible to provide an image display apparatus which can improve the controllability of particles, as compared to a configuration which controls the level of a voltage to drive particles.

According to the configuration described in (12), it is possible to provide a driving program which can reduce an image rewriting time, as compared to a configuration which controls the level of a voltage to drive particles.

According to the configuration described in (13), it is possible to provide a non-transitory computer-readable medium storing a driving program which can reduce an image rewriting time, as compared to a configuration which controls the level of a voltage to drive particles.

DESCRIPTION OF EMBODIMENTS

Figure 1A:
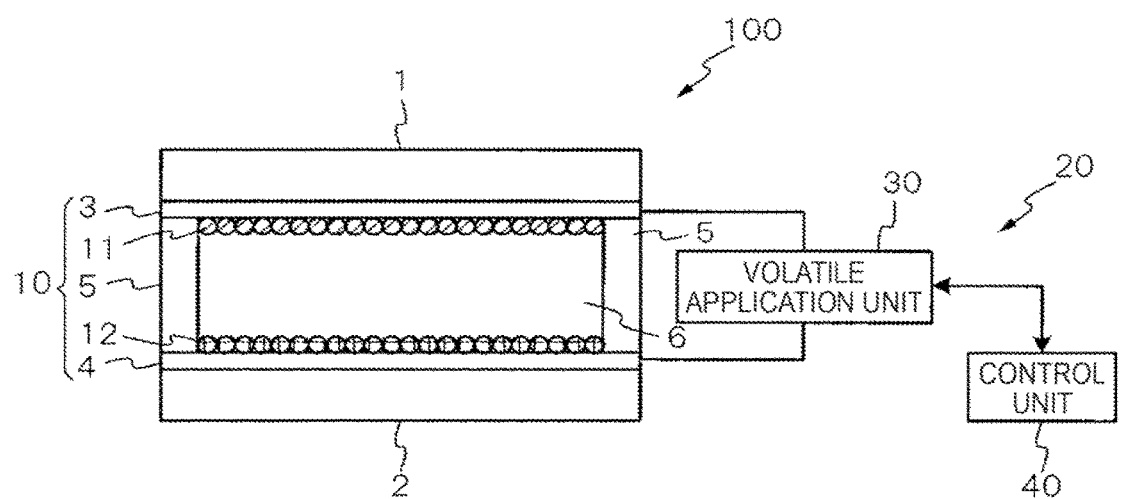
FIG. 1A is a schematic diagram illustrating an image display apparatus according to an embodiment.

Hereinafter, an embodiment will be described with reference to the drawings. In the drawings, members having the same operations and functions are denoted by the same reference numerals and the description thereof will not be repeated. In addition, for simplicity of explanation, this embodiment will be described using the drawings in which attention is paid to an appropriate cell. In the invention, the term "adhesive force" means force required to maintain the attachment of particles to a substrate.

FIG. 1A schematically illustrates an image display apparatus according to this embodiment. An image display apparatus 100 includes an image display medium 10 and a driving device 20 that drives the image display medium 10. The driving device 20 includes a voltage application unit 30 that applies a voltage between a display-side electrode 3 and a rear side electrode 4 of the image display medium 10 and a control unit 40 that controls the voltage application unit 30 on the basis of information about the image displayed on the image display medium 10.

The image display medium 10 includes a pair of substrates, that is, a transparent display substrate 1 which is an image display surface and a rear substrate 2 which is a non-display surface. The pair of substrates are arranged so as to face each other with a gap therebetween.

Spacer members 5 are provided which maintain a predetermined gap between the substrates 1 and 2 and partition a space between the substrates into plural cells.

The term "cell" means a region which is surrounded by the rear substrate 2 having the rear side electrode 4 provided thereon, the display substrate 1 having the display-side electrode 3 provided thereon, and the spacer members 5. The cell is enclosed with, for example, a dispersion medium 6 which is an insulating liquid and first and second particle groups 11 and 12 which are dispersed in the dispersion medium 6. The first particle group 11 is a group of particles A, which will be described below, and the second particle group 12 is a group of particles B, which will described below.

The first particle group 11 and the second particle group 12 have different colors. In addition, the first particle group 11 and the second particle group 12 have different adhesive forces to maintain attachment to the substrates and have different voltages required for separation from the substrates in a state in which the first and second particle groups are attached to the substrate by the electric field between the substrates. The image display apparatus is characterized in that a voltage applied between the pair of electrodes 3 and 4 is controlled such that the first particle group 11 and the second particle group 12 migrate independently. Specifically, when force to separate particles from the substrate is stronger than adhesive force due to the electric field generated by the application of the voltage, the particles are separated from the substrate and move to the other substrate. The voltage at which the force generated by the electric field is equilibrated with the adhesive force and the particles start to move is referred to as a threshold voltage. In this embodiment, even after the first particle group 11 and the second particle group 12 are moved to display an image and the application of the voltage is stopped, the particles are kept attached to the substrates by, for example, van der Waal's force, image force, or electrostatic attractive force and the display of the image is maintained. For example, the image force, the electrostatic attractive force, or the van der Waal's force may be adjusted to control the adhesive force of the particles. As means for controlling the adhesive force, for example, the amount of charge, diameter, charge density, permittivity, surface shape, or surface energy of the particle or the composition or density of a dispersant is appropriately adjusted. The image display medium may include a white particle group which is colored white, in addition to the first particle group 11 and the second particle group 12. In this case, the white particle group may be a floating particle group which has a smaller amount of charge than the first particle group 11 and the second particle group 12 and does not move to any electrode even when a voltage for moving the first particle group 11 and the second particle group 12 to one of the electrodes is applied between the electrodes. Alternatively, the image display medium may include two types of particle groups, that is, the first particle group 11 or the second particle group 12 and the floating particle group. Alternatively, a coloring agent may be mixed with the dispersion medium to display a color (for example, white) different from the color of the electrophoretic particle.

The driving device 20 (the voltage application unit 30 and the control unit 40) controls the voltage between the display-side electrode 3 and the rear side electrode 4 of the image display medium 10 on the basis of the color to be displayed and moves the particle groups 11 and 12 so as to be attracted to the display substrate 1 or the rear substrate 2 according to the charging characteristics of each particle group.

The voltage application unit 30 is electrically connected to the display-side electrode 3 and the rear side electrode 4. In addition, the voltage application unit 30 is connected to the control unit 40 so as to transmit and receive signals.

Figure 1B:
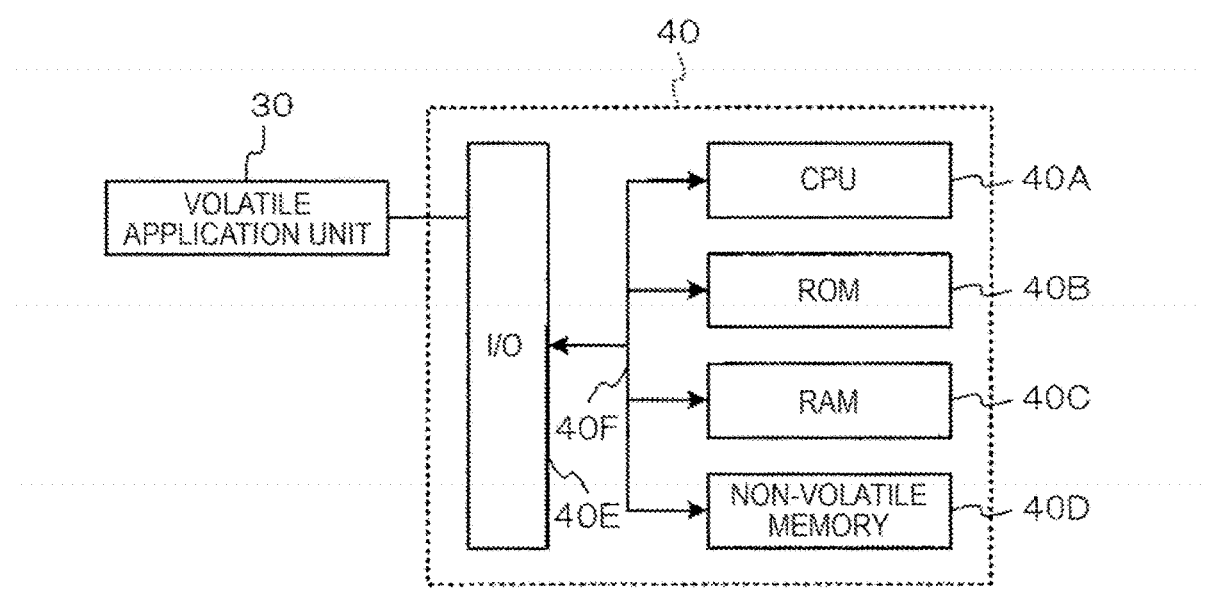
FIG. 1B is a block diagram illustrating the structure of a control unit of the image display apparatus according to this embodiment.

As shown in FIG. 1B, the control unit 40 is, for example, a computer 40. For example, the computer 40 is configured such that a central processing unit (CPU) 40A, a read only memory (ROM) 40B, a random access memory (RAM) 40C, a non-volatile memory 40D, and an input/output interface (I/O) 40E are connected to each other through a bus 40F. The voltage application unit 30 is connected to the I/O 40E. In this case, a program which causes the computer 40 to perform a process of instructing the voltage application unit 30 to apply the voltage required to display each color is written to, for example, the non-volatile memory 40D. The CPU 40A reads the program and executes the read program. The program may be provided by a recording medium such as a CD-ROM.

The voltage application unit 30 is a voltage application device for applying a voltage between the display-side electrode 3 and the rear side electrode 4 and applies a voltage corresponding to the control of the control unit 40 between the display-side electrode 3 and the rear side electrode 4. The voltage application unit 30 may be an active matrix type or a passive matrix type. Alternatively, the voltage application unit 30 may be a segment type.

However, as a method for driving the particle groups which require different forces (adhesive forces) to maintain attachment to the substrates, such as the first particle group 11 and the second particle group 12, as in this embodiment, a method according to the related art controls the level of the voltage applied between the substrates to control the movement of the particle groups. In addition, another method for driving particle groups with different colors controls the movement of the particle groups using a difference in migration speed (mobility) between particles.

Figure 2A:
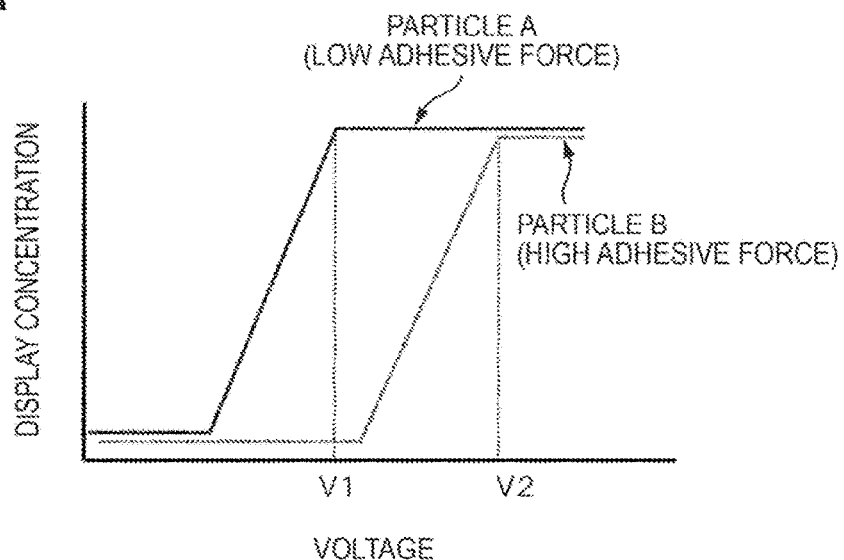
FIG. 2A is a diagram illustrating an example of the operation threshold characteristics of a particle A and a particle B.
Figure 2B:
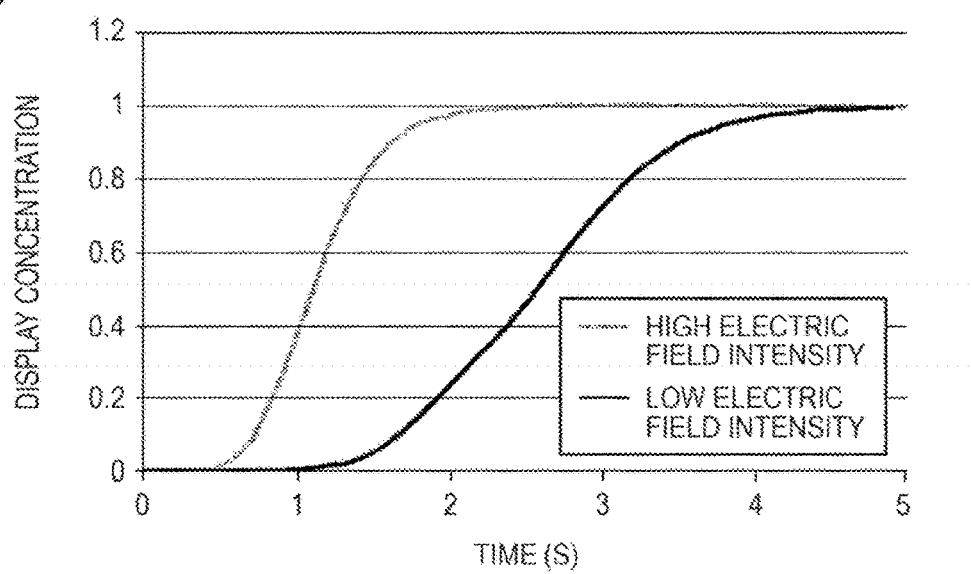
FIG. 2B is a diagram illustrating an example of the relationship between a response time and display concentration when the particle A is driven by different electric field intensities.

For example, for a particle A and a particle B with operation threshold characteristics shown in FIG. 2A, when only the particle A with low adhesive force (small operation threshold value) is moved, a voltage V1 that is higher than a threshold voltage of the particle A and is lower than a threshold voltage of the particle B with high adhesive force is applied to move only the particle A. However, in this method, when only the particle A is moved, only low electric field intensity generated by a voltage less than the voltage V1 is applied. As a result, the response time (image rewriting time) of the particle increases. That is, as shown in FIG. 2B, in a case in which the particle A is driven by different electric field intensities, when the electric field intensity is low, the response is delayed. Therefore, the image rewriting time increases.

Figure 2C:
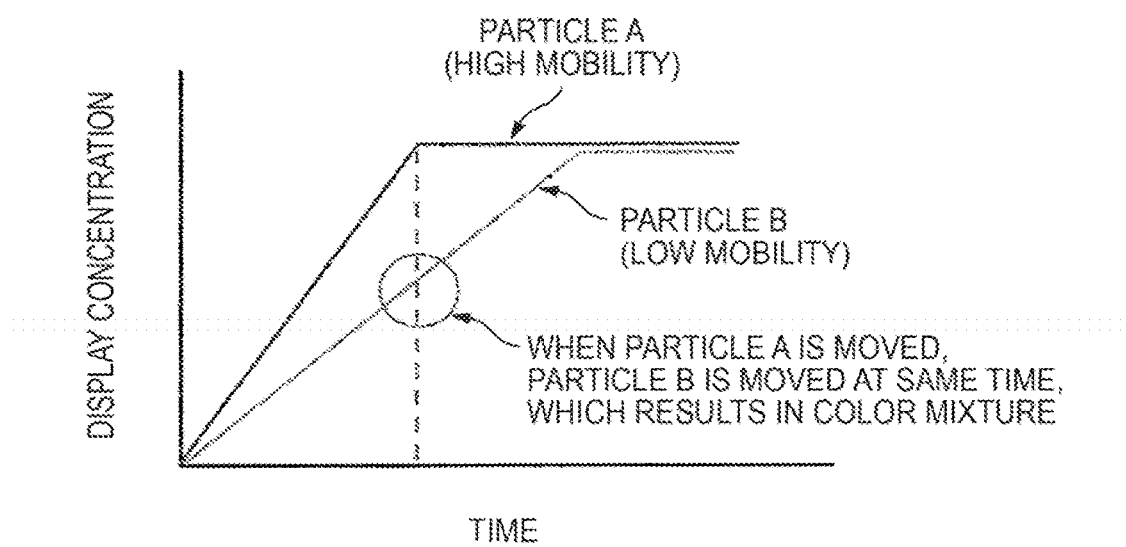
FIG. 2C is a diagram illustrating the occurrence of color mixture by the particle A and the particle B.

On the other hand, when the movement of the particle groups is controlled using the difference in mobility, as shown in FIG. 2C, the particle groups start to be moved at the same time by the application of the voltage. Therefore, it is difficult to completely separate the particle groups and to control the particle groups. As a result, color mixture occurs and image quality deteriorates.

Figure 3A:
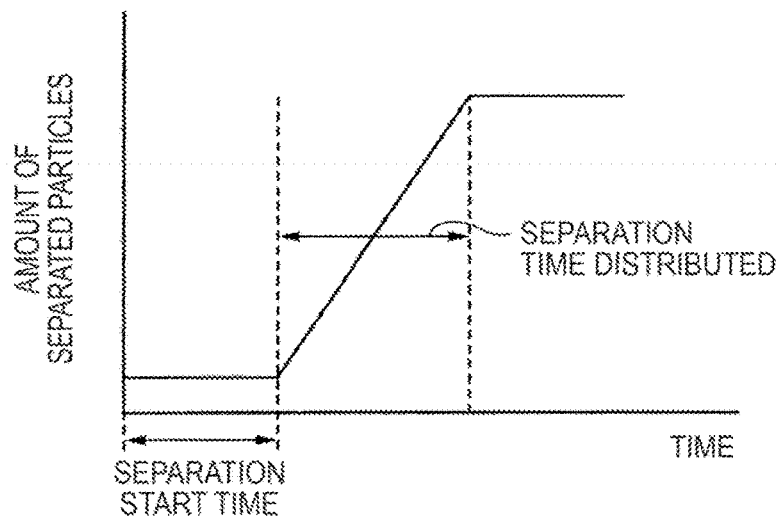
FIG. 3A is a diagram illustrating the separation of a particle group with a separation time distribution from a substrate.

In contrast, the inventors found that, when driving force and adhesive force were appropriately designed, particles remained for a given time (separation start time), without being separated from the substrates immediately after a voltage was applied between electrodes, and a particle group was separated from the substrates in a given distribution (a separation time distribution shown in FIG. 3A).

Figure 3B:
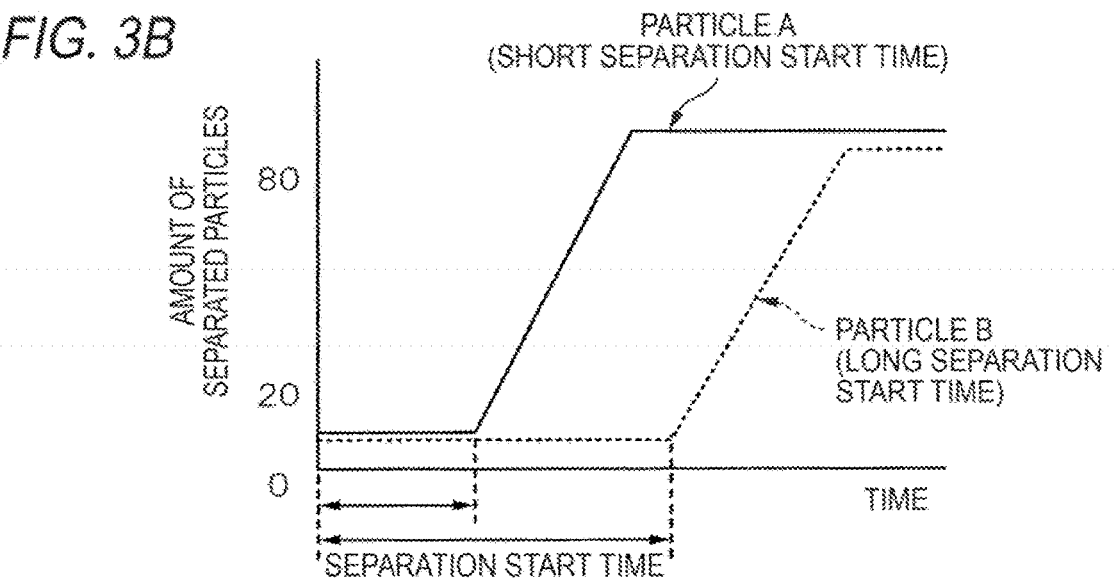
FIG. 3B is a diagram illustrating an example of particle groups with different separation start times from the substrate.

That is, when plural types of particle groups have different separation start times, it is possible to selectively drive the particle groups with different separation start times when the particle groups are separated from the substrates, as shown in FIG. 3B. In addition, some particles in the particle group are separated using the separation time distribution to control gradation.

Figure 4A:
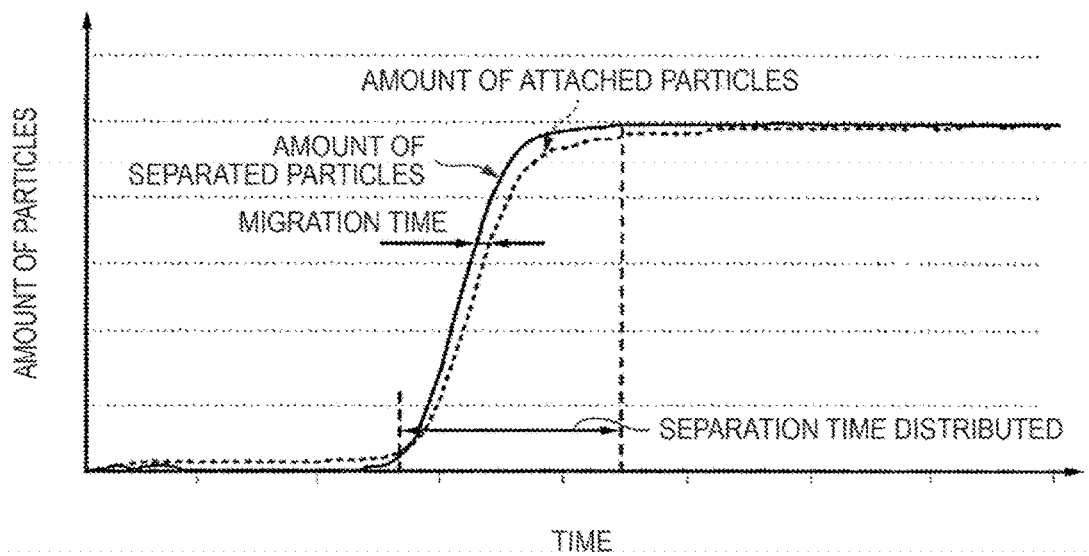
FIG. 4A is a diagram illustrating a change in the amount of particles on the substrate when a constant voltage is applied to a given particle group.
Figure 4B:
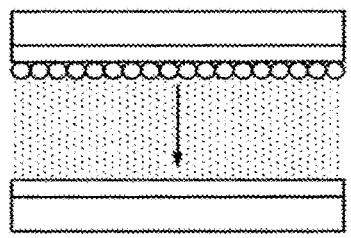
FIG. 4B is a diagram illustrating the observation of the separation of particles from the substrate.
Figure 4C:
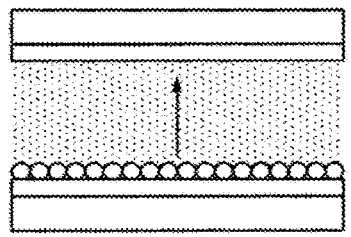
FIG. 4C is a diagram illustrating the observation of the attachment of particles to the substrate.

FIG. 4A is a diagram illustrating a change in the amount of particles on the substrate when a constant voltage is applied to a given particle group. The change in the amount of particles is observed by the separation of particles from the substrate or the attachment of particles to the substrate (see FIGS. 4B and 4C).

As shown in FIG. 4A, for the time from the start of the separation of the particle group from the substrate to the end of the separation, the time from the start of the separation of the particle group from the substrate to the end of the separation of all particles (separation time distribution) is significantly longer than the time (migration time) required for the separated particles to migrate between the substrates and to reach the opposite substrate.

Therefore, a difference in the migration time (mobility) between the particle groups is not considered and a difference in the separation time is controlled to selectively move a desired particle group.

Figure 5A:
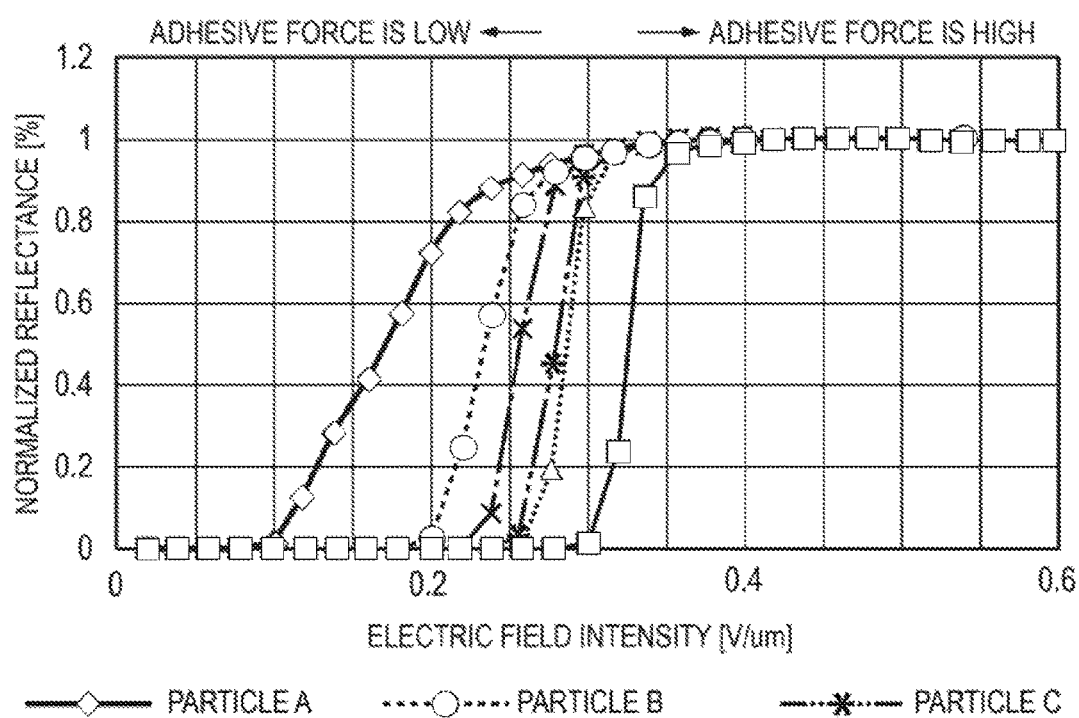
FIG. 5A is a diagram illustrating a change in normalized reflectance when voltage pulses that have the same duration and different levels are applied to plural particles A to F.
Figure 5B:
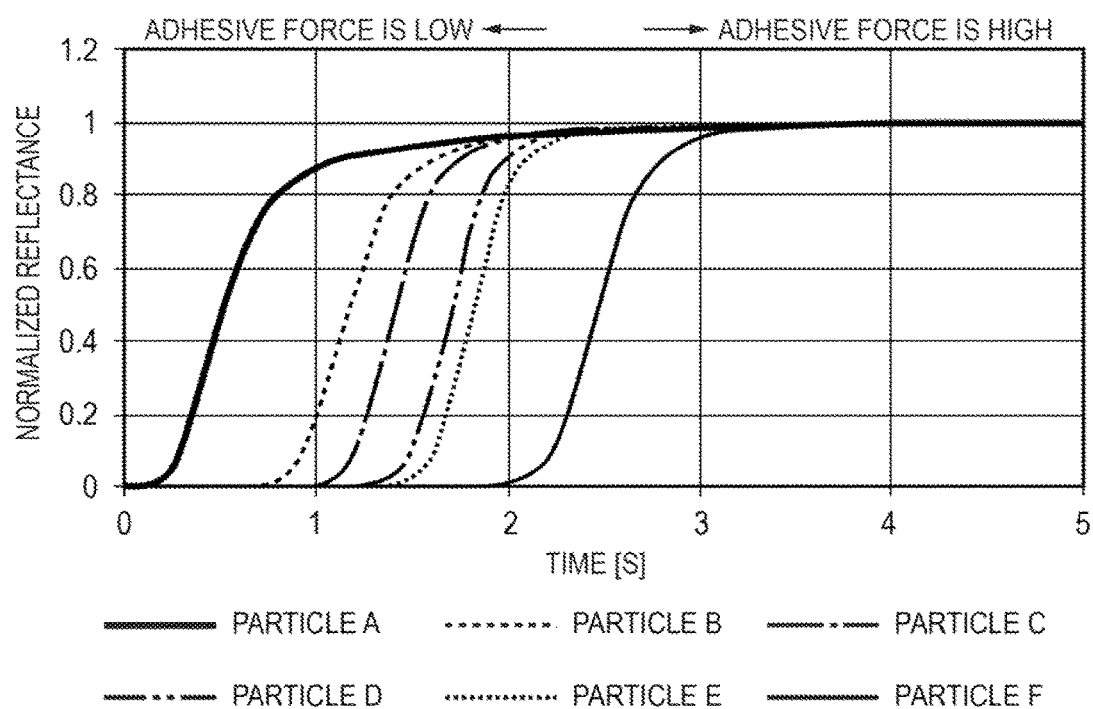
FIG. 5B is a diagram illustrating a change in normalized reflectance when voltage pulses that have the same level and different lengths are applied to the plural particles A to F.

FIG. 5A shows a change in normalized reflectance when voltage pulses which have the same duration and different levels are applied to plural particles A to F. FIG. 5B shows a change in normalized reflectance when voltage pulses which have the same level and different lengths are applied to the plural particles A to F.

As shown in FIG. 5A, when the voltage pulses which have the same duration are applied to the particles which require different forces (adhesive forces) to maintain attachment to the substrate, electric field intensity (operation threshold value) at which particles with high adhesive force start to move is greater than that at which particles with low adhesive force start to move. On the other hand, as shown in FIG. 5B, when the voltage pulses which have the same level are applied, the time required for the particles to be separated from the substrate varies depending on the adhesive force of the particles and the time (response time) when the particles with high adhesive force start to move is longer than that when the particles with low adhesive force start to move.

In this embodiment, the voltage pulses which have the same level and different lengths are applied to selectively drive only a specific particle group among the particle groups with different adhesive forces.

When the voltage pulses which have different levels and the same application time are applied, the gradient of electric field-normalized reflectance characteristics varies depending on the particles and the gradient of the electric field-normalized reflectance characteristics of the particle with low adhesive force is smaller than that of the particle with high adhesive force, as shown in FIG. 5A. On the other hand, when the voltage pulses which have the same level are applied, the gradients of the time-normalized reflectance characteristics of the particles are substantially constant and the time-normalized reflectance characteristics have characteristic curves which shift in parallel, as shown in FIG. 5B. Therefore, as in this embodiment, when the voltage pulses which have the same level and different lengths are applied, the independent controllability of each particle group is improved, as compared to when the voltage pulses which have the same duration and different levels are applied.

However, as shown in FIG. 5B, when the separation time distributions of the particle A and the particle B do not overlap each other, the application time of the voltages which have the constant level can be controlled to selectively drive the particles. However, in some cases, it is difficult to set the separation time distributions so as not to overlap each other.

Figure 6A:
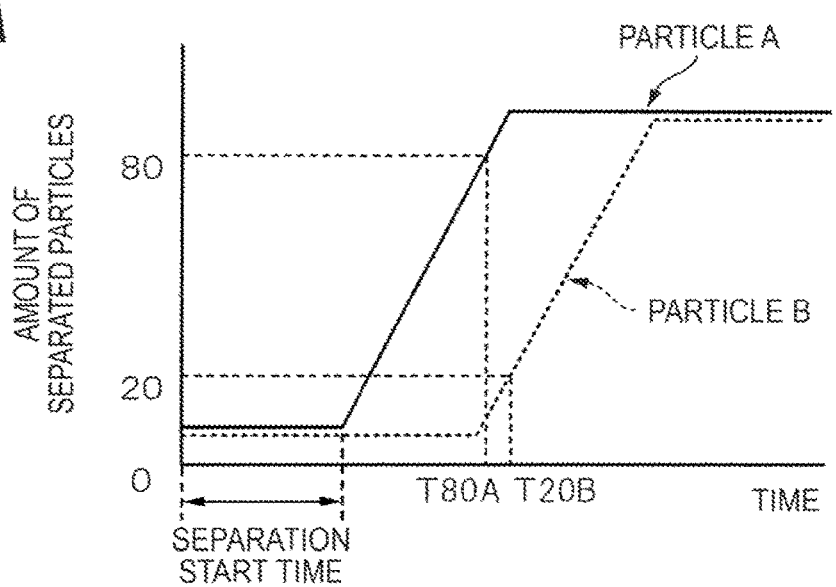
FIG. 6A is a diagram illustrating an example in which a time T80A when 80% of particles in a particle group (particle A) with a short separation start time are separated is shorter than a time T20B when 20% of particles in a particle group (particle B) with a long separation start time are separated.
Figure 6B:
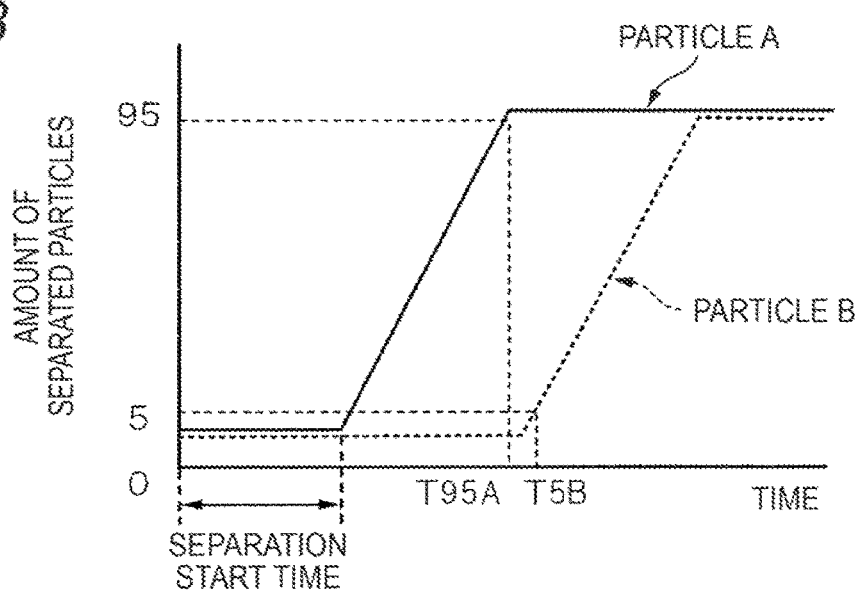
FIG. 6B is a diagram illustrating an example in which a time T95A when 95% of particles in the particle group (particle A) with the short separation start time are separated is shorter than a time T5B when 5% of particles in the particle group (particle B) with the long separation start time are separated.

In this case, as shown in FIG. 6A, when the time when 80% of the particles in the particle group (particles A) with a short separation start time are separated is T80A and the time when 20% of the particles in the particle group (particles B) with a long separation start time are separated is T20B, the device is designed such that $T80A < T20B$ is satisfied, which makes it possible to display a clear image without color mixture. As shown in FIG. 6B, when the device is designed such that $T95A < T5B$ is satisfied, it is possible to display a desirable image without color mixture. In addition, the invention is not limited to the above-mentioned values. That is, plural types of particles may be set such that the time when predetermined A % (A>50) of particles which have a short separation start time from the substrate after the voltage starts to be applied are separated is shorter than the time when (100−A)% of particles which have a long separation start time from the substrate after the voltage starts to be applied are separated.

Figure 7A:
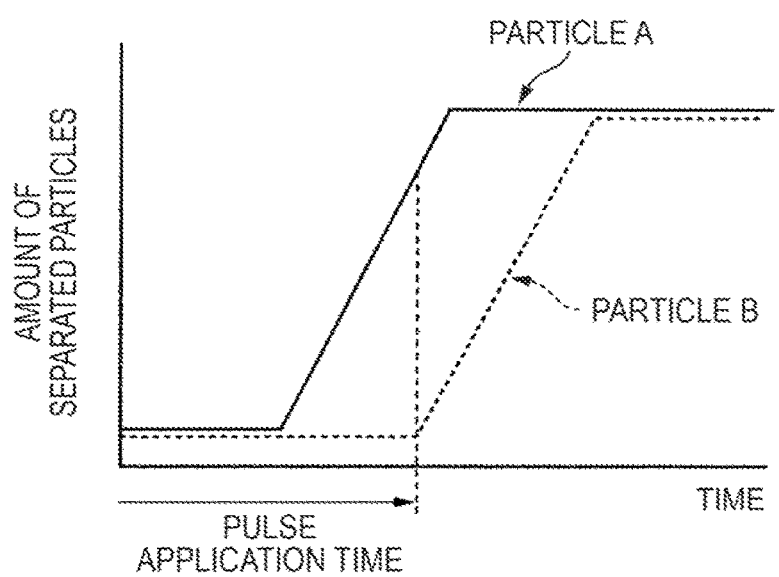
FIG. 7A is a diagram illustrating an example of the pulse application time when the separation time distributions of each particle group are not completely separated from each other.
Figure 7B:
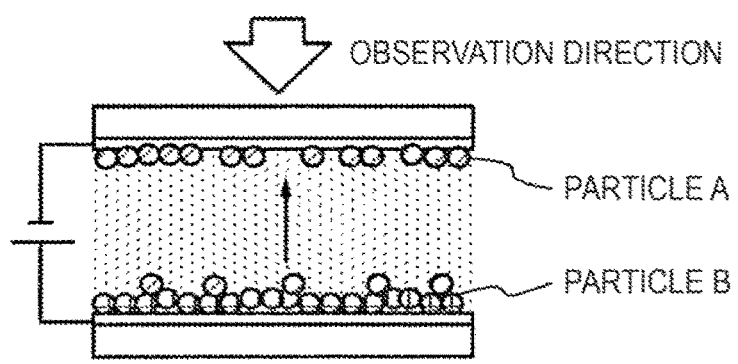
FIG. 7B is a schematic diagram illustrating the movement of particles at the pulse application time shown in FIG. 7A.
Figure 7C:
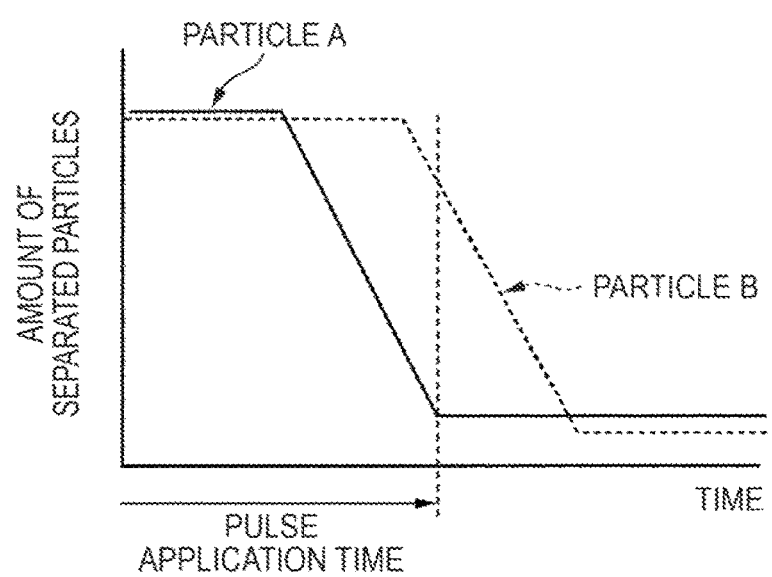
FIG. 7C is a diagram illustrating another example of the pulse application time when the separation time distributions of each particle group are not completely separated from each other.
Figure 7D:
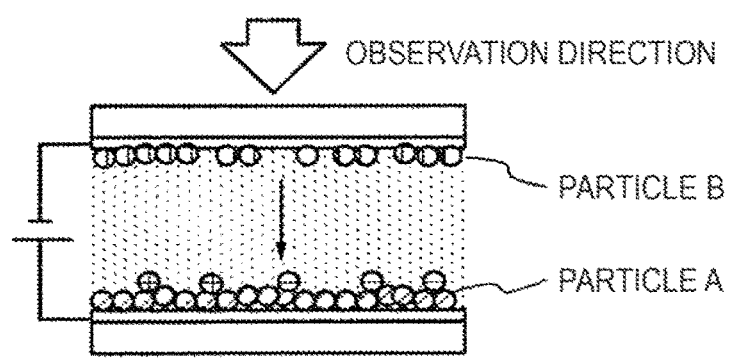
FIG. 7D is a schematic diagram illustrating the movement of particles at the pulse application time shown in FIG. 7C.

When the separation time distributions of each particle group are not completely separated from each other, a pulse application voltage is controlled such that only one particle group is attached to the display substrate 1, thereby preventing a reduction in chroma due to color mixture. For example, in the example shown in FIG. 7A, the pulse application time is set to be shorter than the separation start time of the particle B. Therefore, only the particles A move to the display substrate 1 and the color of the particles A is displayed, as shown in FIG. 7B. In the example shown in FIG. 7C, the pulse application voltage is applied for a time that is equal to or more than the time when all of the particles A start to move to the rear substrate 2. In this case, as shown in FIG. 7D, the color of the particles B is displayed.

Figure 8A:
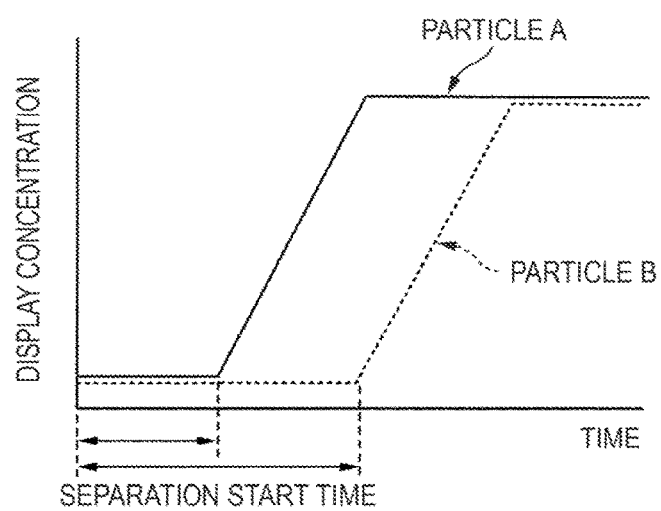
FIG. 8A is a diagram illustrating an example of the particle A with a short separation start time and the particle B with a long separation time.
Figure 8B:
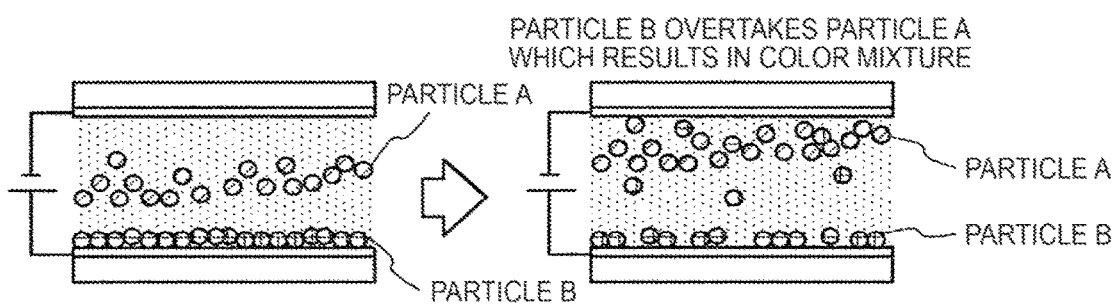
FIG. 8B is a diagram illustrating an example in which some of the migrating particles B overtake the particles A and color mixture occurs.

The inventors found that, as the surface charge density of particles increased, the separation time tended to increase. In this case, when the movement aspect of the particles from the rear substrate to the display substrate is observed and the particle groups have the same average particle diameter, a particle group (for example, the particles B in the example shown in FIG. 8A) with a longer separation time has a higher migration speed. Therefore, as shown in FIG. 8B, in some cases, some of the migrating particles B overtake the particles A, which results in color mixture.

The particle groups have different average particle diameters at a ratio that is greater than the ratio of the surface charge density of the particle A and the surface charge density of the particle B. In this case, the migration speed of the particle A is higher than that of the particle B and color mixture due to overtaking is prevented.

Figure 8C:
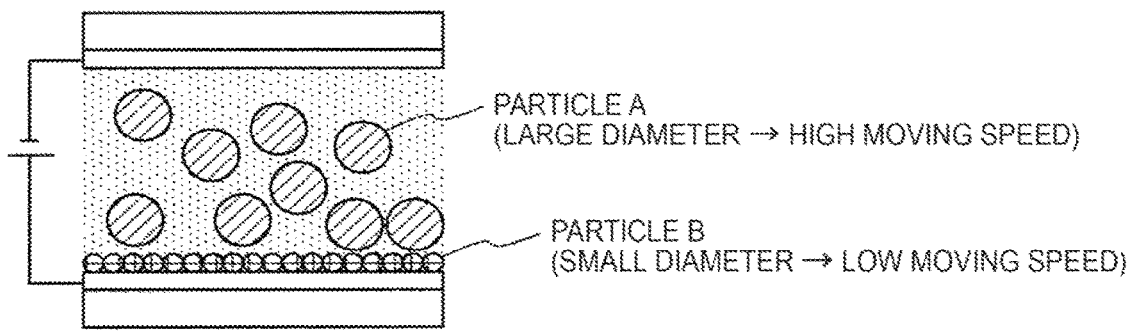
FIG. 8C is a diagram illustrating an example in which the diameter of the particle A is set to a large value to prevent color mixture due to overtaking.

That is, when the amount of charge of a particle is q, the diameter of the particle is d, surface charge density is p, and the viscosity of a dispersion medium is t, the migration speed v of an electrophoretic particle is represented by $v=(qE)/(6\pi \eta d)$ (where $q=4\pi(d/2)^2 \rho$). That is, the migration speed v is represented by $v=(d\rho E)/6\eta$. Therefore, it is possible to increase the migration speed by increasing the value of the diameter d×the surface charge density ρ of the particle. For example, in the example shown in FIG. 8B, as shown in FIG. 8C, the diameter d of the particle A is set to be greater than that of the particle B such that the value of the diameter d×the surface charge density ρ of the particle A is greater than the value of the diameter d×the surface charge density ρ of the particle B. Therefore, color mixture due to overtaking is prevented.

Next, a detailed method for driving the image display apparatus according to this embodiment will be described. Hereinafter, a case will be described in which, for example, both the first particle group 11 and the second particle group 12 are positively charged, the display-side electrode 3 is grounded, and a voltage is applied to the rear side electrode 4. In addition, in the following description, it is assumed that the image display apparatus is driven in an initial state in which a negative voltage that is equal to or greater than the operation threshold value of a particle group with the highest adhesive force among plural types of particle groups is applied between the substrates to attach the first particle group 11 and the second particle group 12 to the rear substrate 2. In addition, in the drawings used in the following description, the operation threshold voltage of the first particle group 11 is represented by VA and the operation threshold voltage of the second particle group 12 is represented by VB.

Figure 9A:
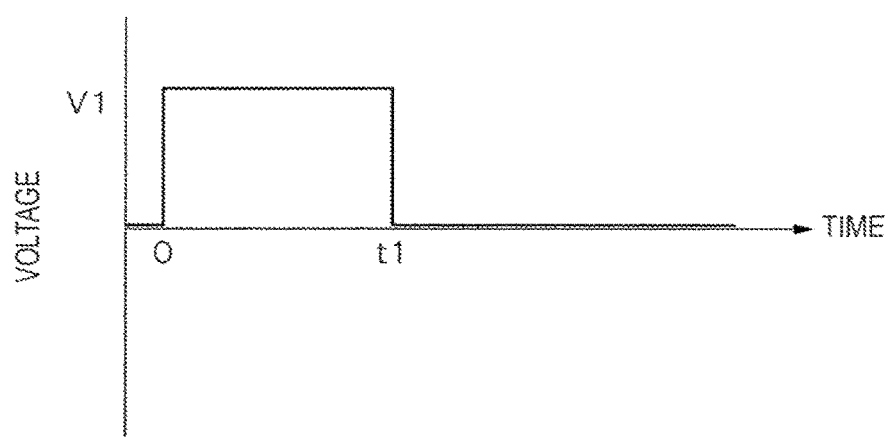
FIG. 9A is a diagram illustrating an example of a driving pulse for displaying the color of the first particle group.
Figure 9B:
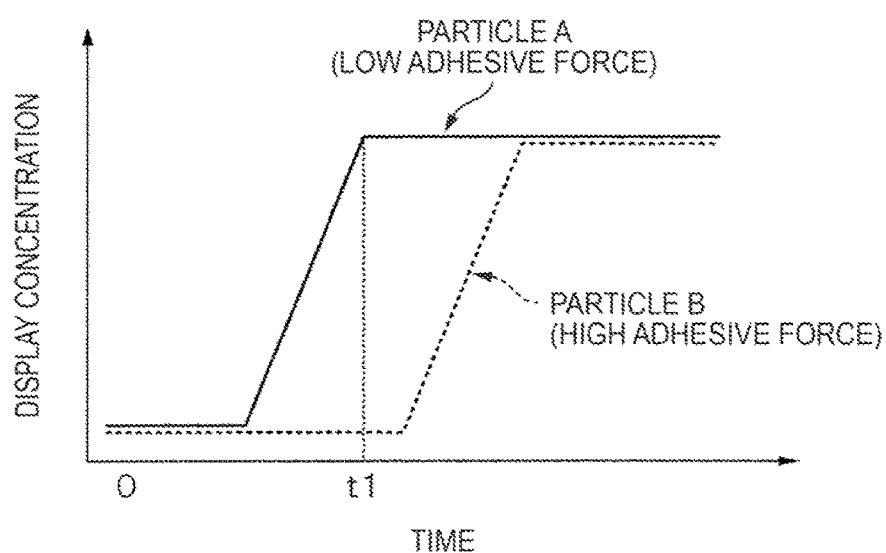
FIG. 9B is a diagram illustrating an example of a change in display concentration with respect to the application time of the driving pulse shown in FIG. 9A.
Figure 9C:
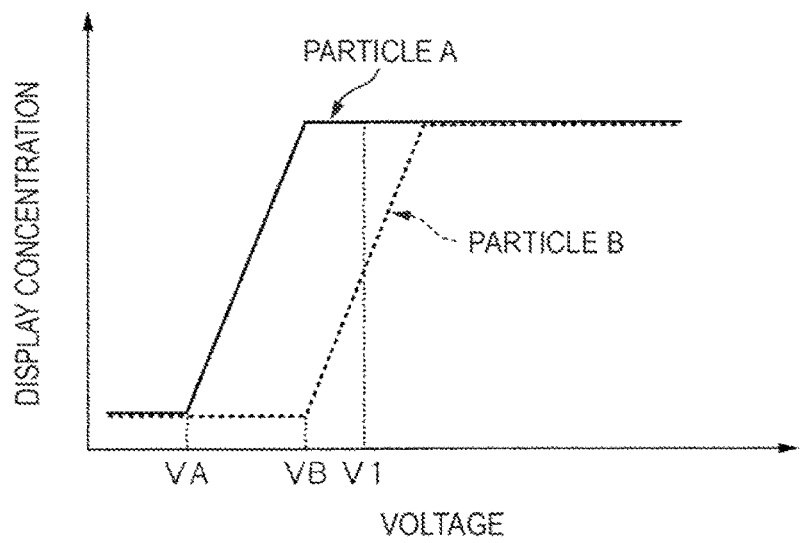
FIG. 9C is a diagram illustrating the relationship between the voltage and display concentration of the particles A and B.

First, a driving method when the color of the first particle group 11 is displayed will be described. FIG. 9A is a diagram illustrating an example of a driving pulse for displaying the color of the first particle group 11. FIG. 9B is a diagram illustrating an example of a change in display concentration with respect to the application time of the driving pulse shown in FIG. 9A. FIG. 9C is a diagram illustrating the relationship between the voltage and display concentration of the particles A and B.

When the color of the first particle group 11 is displayed, a pulse voltage is applied which is a voltage V1 greater than the operation threshold voltage VB (FIG. 9C) of the particle group (the second particle group 12 which is a group of the particles B) with the highest adhesive force among the plural types of particle groups and has a duration t1 (FIGS. 9A and 9B) for which only a particle group (the first particle group 11 which is a group of the particles A) with low adhesive force is separated.

Figure 10A:
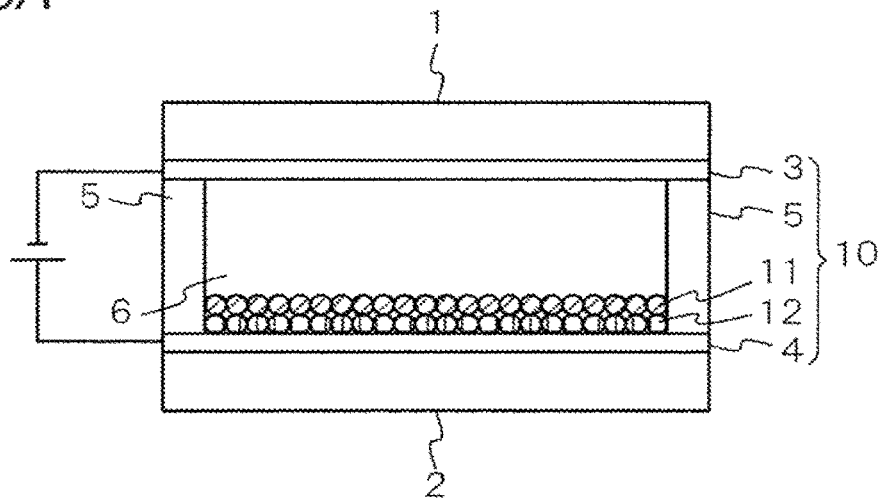
FIG. 10A is a diagram illustrating an initial state in which the first particle group and the second particle group are attached to a rear substrate.
Figure 10B:
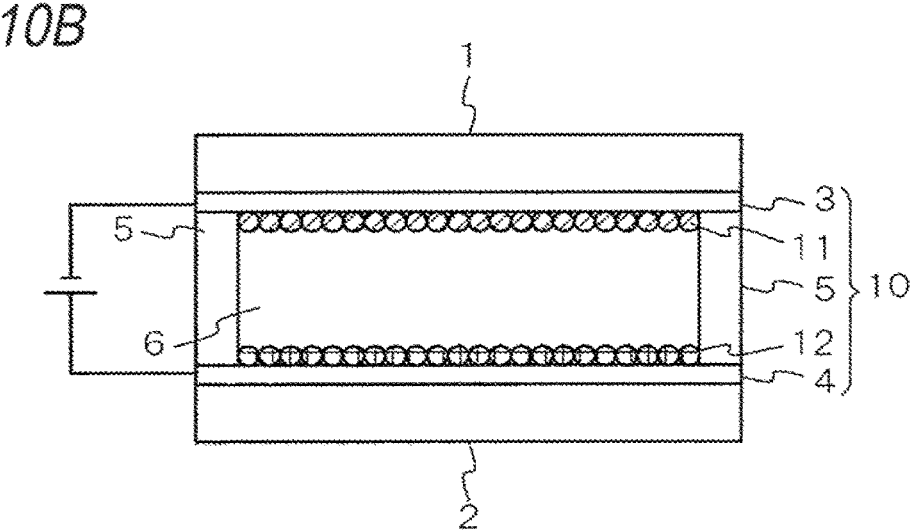
FIG. 10B is a diagram illustrating a state in which the color of the first particle group is displayed.

Then, in the initial state (FIG. 10A) in which the first particle group 11 and the second particle group 12 are attached to the rear substrate 2, only the first particle group 11 is separated from the rear substrate 2, moves to the display substrate 1, and is then attached to the display substrate 1, as shown in FIG. 10B. Therefore, the color of the first particle group 11 is displayed.

Figure 11A:
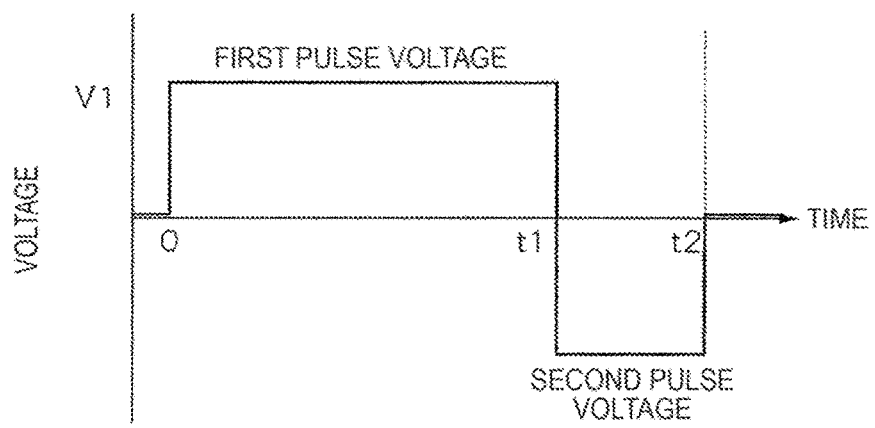
FIG. 11A is a diagram illustrating an example of a driving pulse for displaying the color of the second particle group.
Figure 11B:
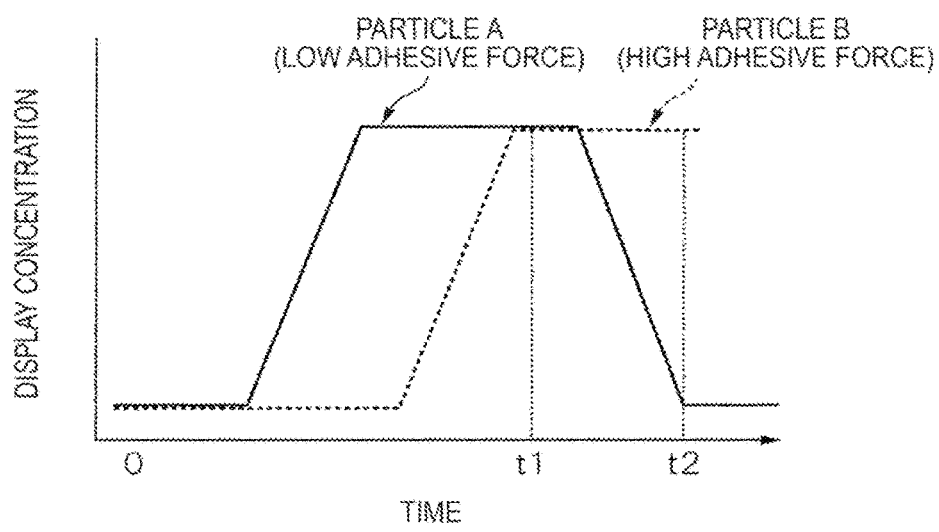
FIG. 11B is a diagram illustrating an example of a change in display concentration with respect to the application time of the driving pulse shown in FIG. 11A.
Figure 11C:
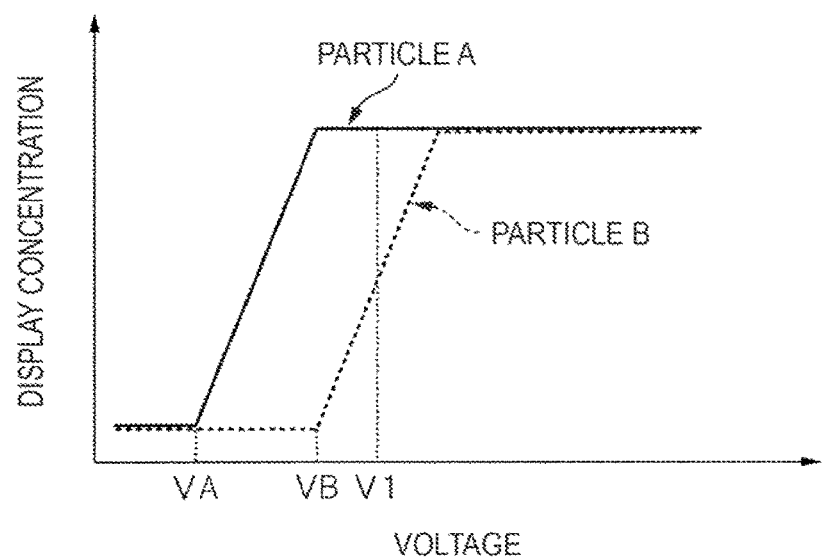
FIG. 11C is a diagram illustrating the relationship between the voltage and display concentration of the particles A and B.

Next, a driving method when the color of the second particle group 12 is displayed will be described. FIG. 11A is a diagram illustrating an example of a driving pulse for displaying the color of the second particle group 12. FIG. 11B is a diagram illustrating an example of a change in display concentration with respect to the application time of the driving pulse shown in FIG. 11A. FIG. 11C is a diagram illustrating the relationship between the voltage and display concentration of the particles A and B.

When the color of the second particle group 12 is displayed, a first pulse voltage is applied which is a voltage V1 greater than the operation threshold voltage VB (FIG. 11C) of the particle group (the second particle group 12 which is a group of the particles B) with the highest adhesive force among the plural types of particle groups and has a duration t1 (FIGS. 11A and 11B) for which a particle group (second particle group 12) with high adhesive force is separated from the substrate. Then, a second pulse voltage is applied which is a voltage −V1 having the same absolute value as the first pulse voltage and a different polarity from the first pulse voltage and has a duration (t2−t1) (FIGS. 11A and 11B) for which the particle group (second particle group 12) with high adhesive force is not separated from the substrate and only the particle group (first particle group 11) with low adhesive force is separated from the substrate.

Figure 12A:
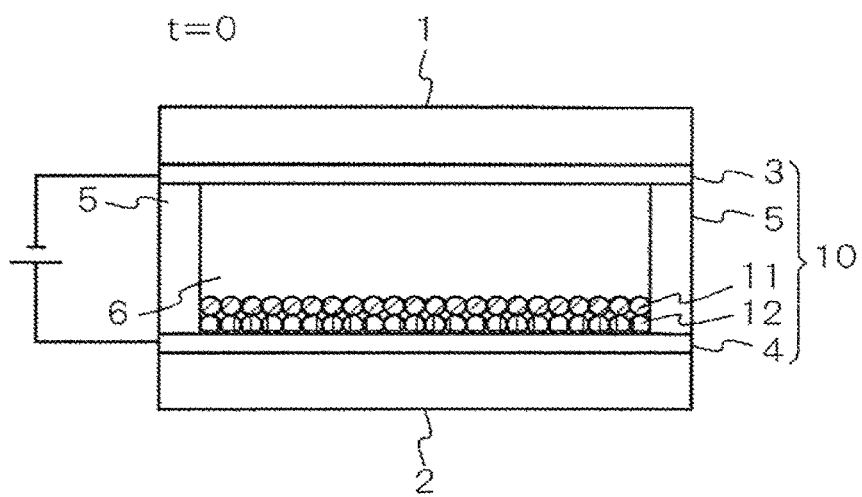
FIG. 12A is a diagram illustrating an initial state in which the first particle group and the second particle group are attached to the rear substrate.
Figure 12B:
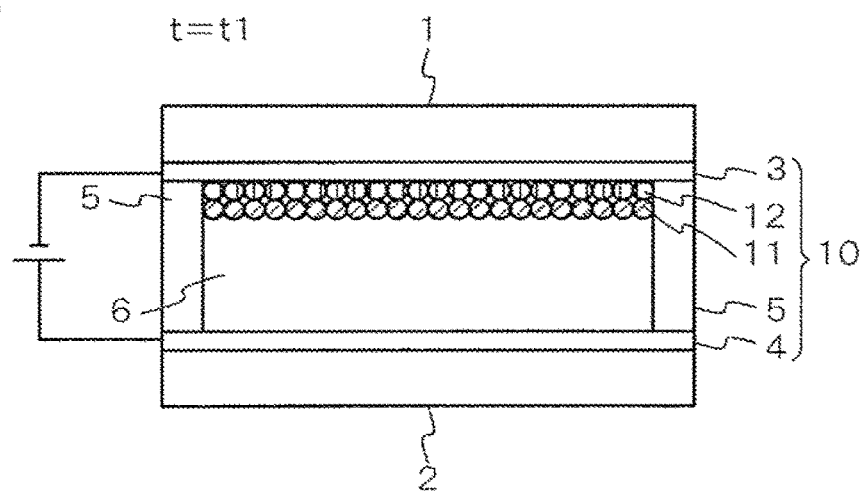
FIG. 12B is a diagram illustrating a state in which the first particle group and the second particle group are attached to a display substrate.

That is, when the first pulse voltage is applied, in a state (FIG. 12A) in which the first particle group 11 and the second particle group 12 are attached to the rear substrate 2, both the first particle group 11 and the second particle group 12 are separated from the rear substrate 2, move to the display substrate 1, and are then attached to the display substrate 1, as shown in FIG. 12B.

Figure 12C:
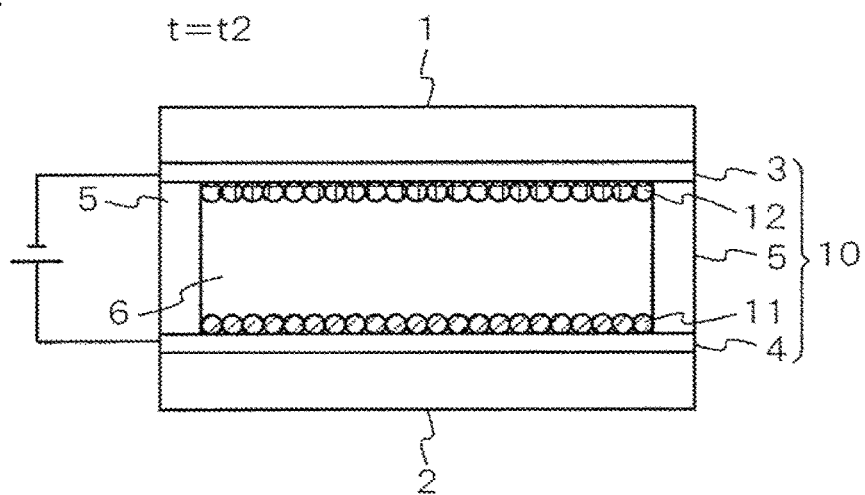
FIG. 12C is a diagram illustrating a state in which the color of the second particle is displayed.

Then, when the second pulse voltage is applied, only the first particle group 11 is separated from the display substrate 1, moves to the rear substrate 2, and is then attached to the rear substrate 2, as shown in FIG. 12C. Therefore, the color of the second particle group 12 is displayed.

Figure 13A:
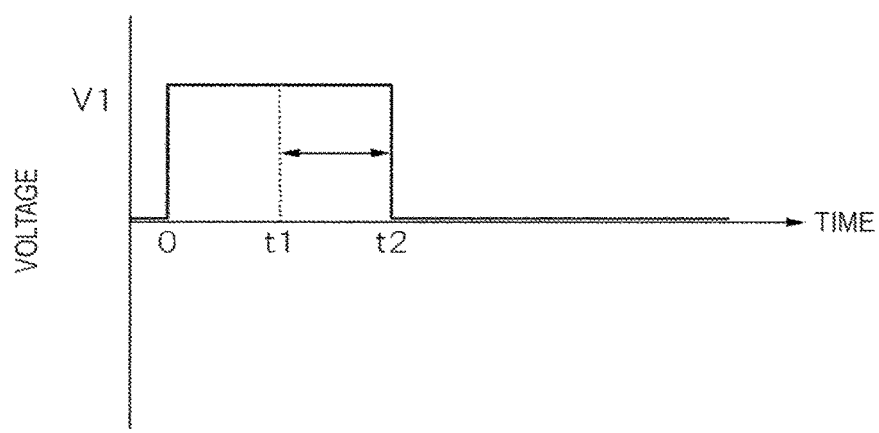
FIG. 13A is a diagram illustrating an example of a driving pulse for displaying the color of the first particle group in gradation.
Figure 13B:
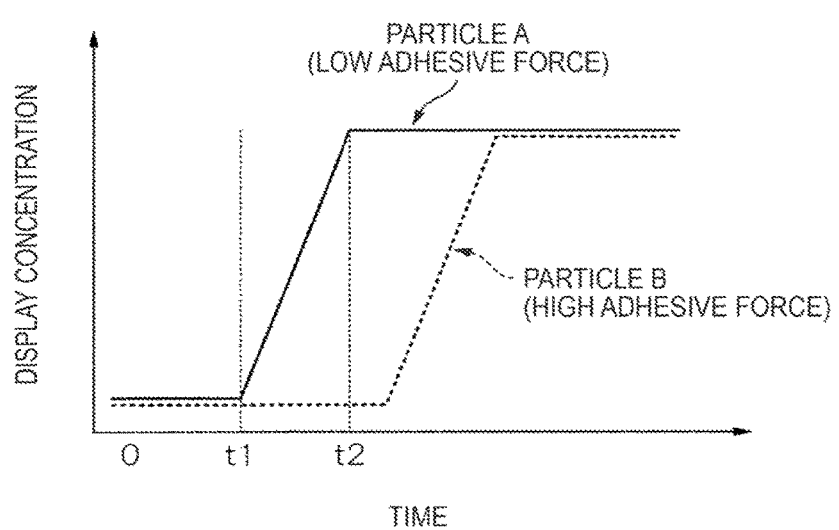
FIG. 13B is a diagram illustrating an example of a change in display concentration with respect to the application time of the driving pulse shown in FIG. 13A.
Figure 13C:
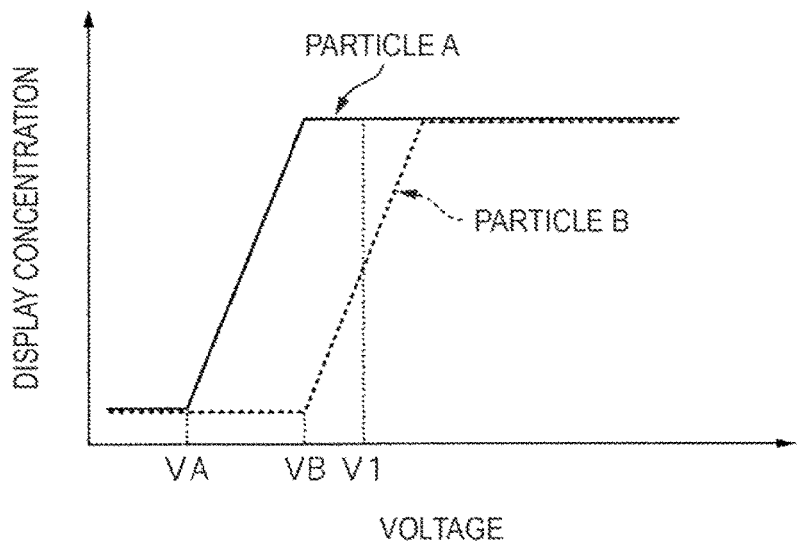
FIG. 13C is a diagram illustrating the relationship between the voltage and display concentration of the particles A and B.

Next, a driving method for displaying the color of the first particle group 11 in gradation will be described. FIG. 13A is a diagram illustrating an example of a driving pulse for displaying the color of the first particle group 12 in gradation. FIG. 13B is a diagram illustrating an example of a change in display concentration with respect to the application time of the driving pulse shown in FIG. 13A. FIG. 13C is a diagram illustrating the relationship between the voltage and display concentration of the particles A and B.

When the color of the first particle group 11 is displayed in gradation, a pulse voltage is applied which is a voltage V1 greater than the operation threshold voltage VB (FIG. 13C) of the particle group (the second particle group 12 which is a group of the particles B) with the highest adhesive force among the plural types of particle groups and has a duration $L_{13}$ ($t1 \le L_{13} \le t2$) (FIGS. 13A and 13B) for which the particle group (second particle group 12) with high adhesive force is not separated and only some particles in the particle group (first particle group 11) with low adhesive force are separated.

Figure 14A:
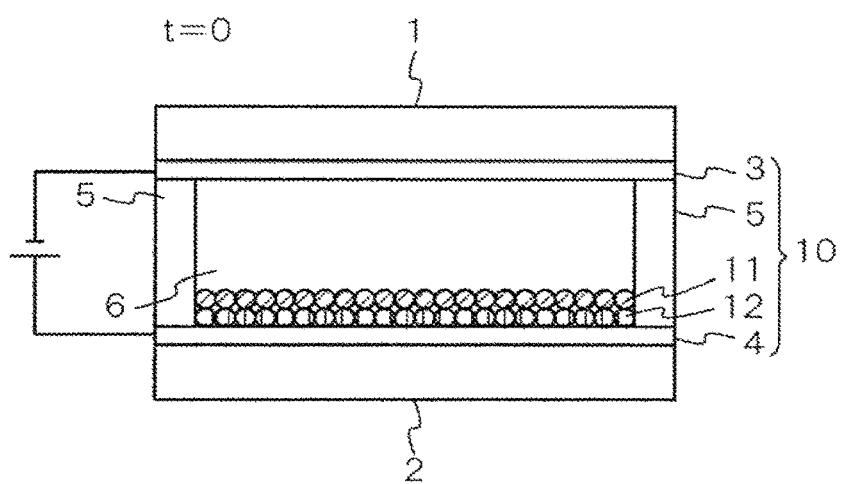
FIG. 14A is a diagram illustrating an initial state in which the first particle group and the second particle group are attached to the rear substrate.
Figure 14B:
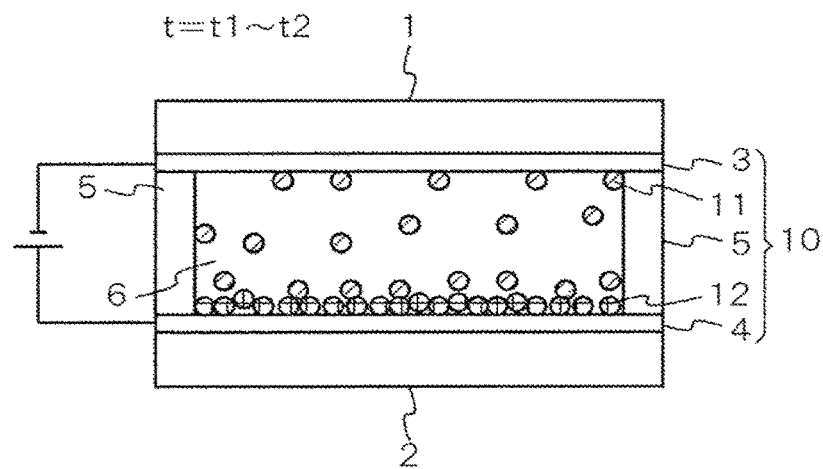
FIG. 14B is a diagram illustrating a state in which some particles in the first particle group are attached to the display substrate.

Therefore, in the state in which the first particle group 11 and the second particle group 12 are attached to the rear substrate 2 (FIG. 14A), as shown in FIG. 14B, only some particles in the first particle group 11 are separated from the rear substrate 2, move to the display substrate 1, and are then attached to the display substrate 1. Therefore, the color of the first particle group 11 is displayed in gradation. In this case, the gradation of the color of the first particle group 11 corresponding to the duration $L_{13}$ is displayed.

Figure 15A:
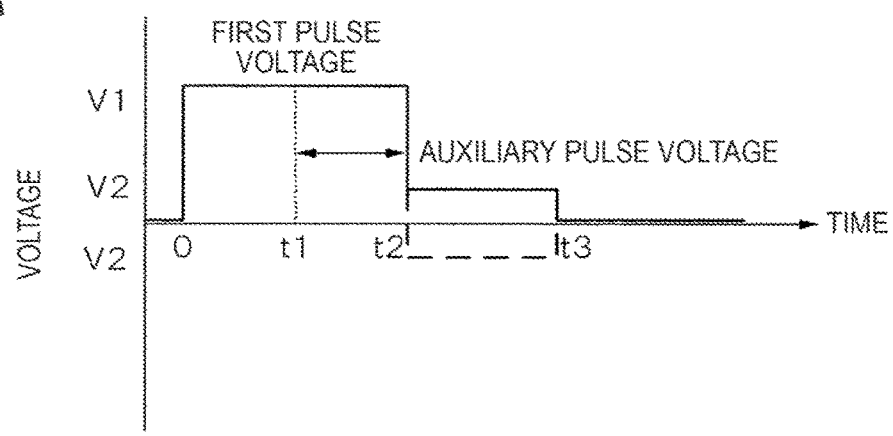
FIG. 15A is a diagram illustrating an example of a driving pulse for displaying the color of the first particle group in gradation and for removing an unstable state.
Figure 15B:
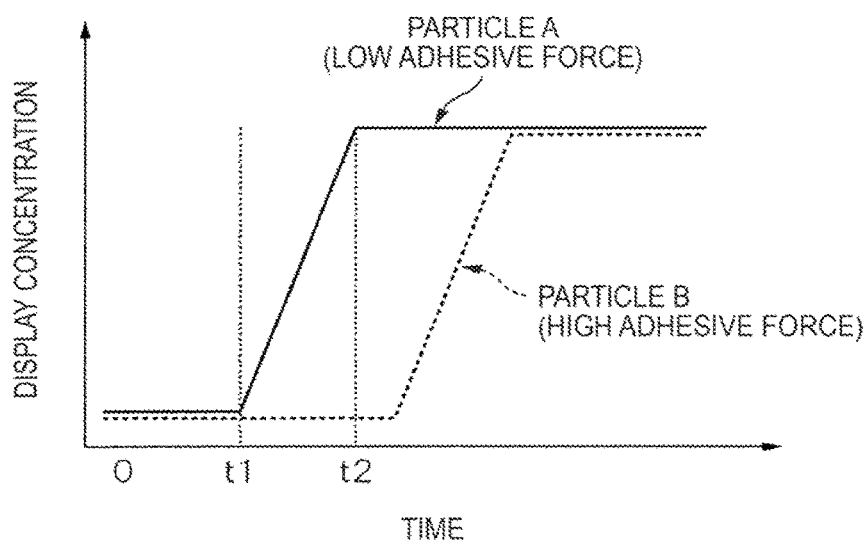
FIG. 15B is a diagram illustrating an example of a change in display concentration with respect to the application time of the driving pulse shown in FIG. 15A.
Figure 15C:
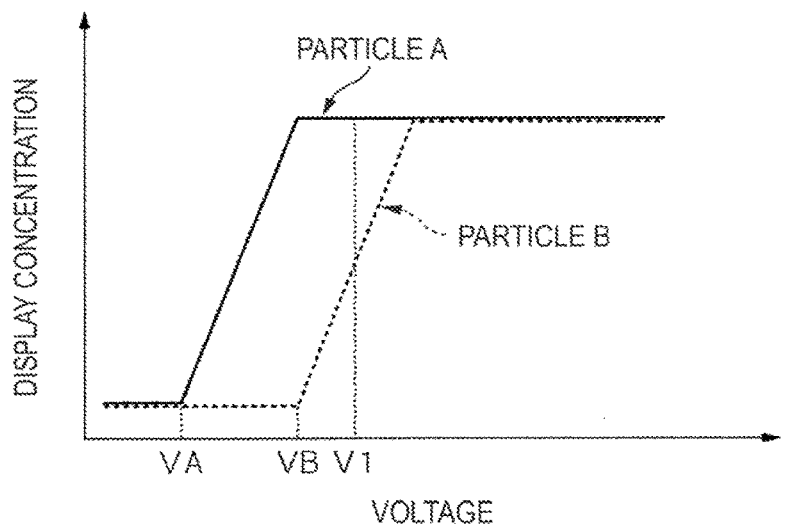
FIG. 15C is a diagram illustrating the relationship between the voltage and display concentration of the particles A and B.

When gradation display is performed, as shown in FIG. 14B, particles other than the particles which are attached to the display substrate 1 in the first particle group 11 separated from the rear substrate 2 float and are in an unstable state. Therefore, a driving method for removing the unstable state will be described. FIG. 15A is a diagram illustrating an example of a driving pulse for displaying the color of the first particle group 12 in gradation and removing the unstable state. FIG. 15B is a diagram illustrating an example of a change in display concentration with respect to the application time of the driving pulse shown in FIG. 15A. FIG. 15C is a diagram illustrating the relationship between the voltage and display concentration of the particles A and B.

First, similarly to the above, a pulse voltage which is a voltage V1 greater than the operation threshold voltage VB (FIG. 15C) of the particle group (the second particle group 12 which is a group of the particles B) with the highest adhesive force among the plural types of particle groups and has a duration $L_{13}$ ($t1 \le L_{13} \le t2$) (FIGS. 15A and 15B) for which the particle group (second particle group 12) with high adhesive force is not separated from the substrate and only some particles in the particle group (first particle group 11) with low adhesive force are separated from the substrate is applied to display the color of the first particle group 11 in gradation.

Then, an auxiliary pulse voltage which is a voltage V2 (see FIGS. 15A and 15C) less than the operation threshold voltages VA and VB of both the particle groups and has a duration $L_1$ ($L_{15} = t3 - t2$) is applied. When the auxiliary pulse voltage is applied, the particles which are attached to the rear substrate 2 do not move and only the particles which are floating between the substrates in the first particle group 11 separated from the rear substrate 2 move to the display substrate 1 and are attached thereto, since the voltage V2 is less than the operation threshold voltages of both the particle groups. In addition, as represented by a dotted line in FIG. 15A, the voltage V2 which is less than the operation threshold voltages of both the particle groups may be a negative voltage with an opposite polarity. That is, the absolute value of a voltage that is less than the absolute values of the operation threshold voltages of both the particle groups may be applied as the auxiliary pulse.

Figure 16A:
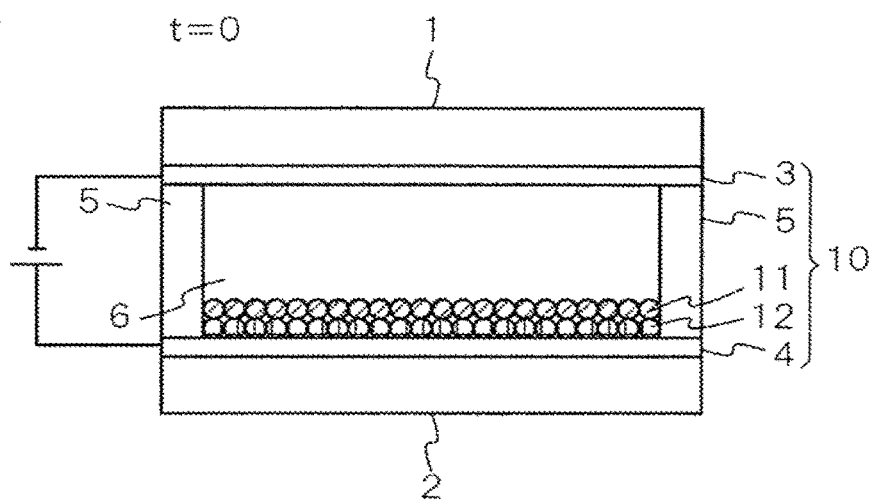
FIG. 16A is a diagram illustrating an initial state in which the first particle group and the second particle group are attached to the rear substrate.
Figure 16B:
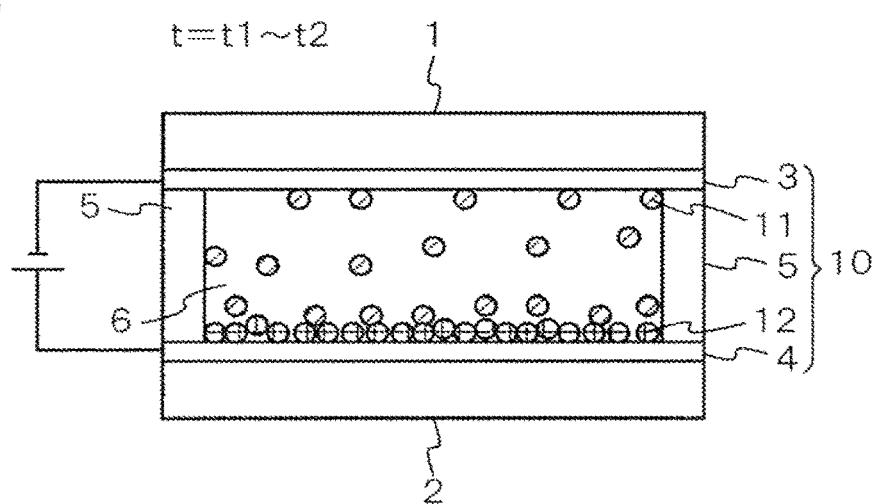
FIG. 16B is a diagram illustrating a state in which some particles in the first particle group are attached to the display substrate.
Figure 16C:
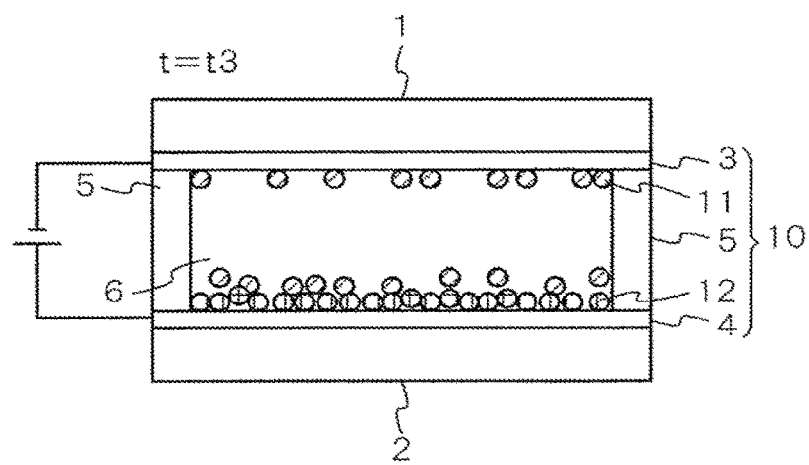
FIG. 16C is a diagram illustrating a stable state in which a floating particle is attached to the display substrate.

Therefore, in the state in which the first particle group 11 and the second particle group 12 are attached to the rear substrate 2 (FIG. 16A), only some particles in the first particle group 11 are separated from the rear substrate 2, move to the display substrate 1, and are then attached thereto, as shown in FIG. 16B. Therefore, the color of the first particle group 11 is displayed in gradation. Then, the particles in the first particle group 11 which are floating due to the auxiliary pulse move to the display substrate 1, are attached thereto, and become stable, as shown in FIG. 16C. In addition, when a negative auxiliary pulse is applied, the first particle group 11 in the floating state returns to the rear substrate 2, is attached thereto, and becomes stable.

Figure 17A:
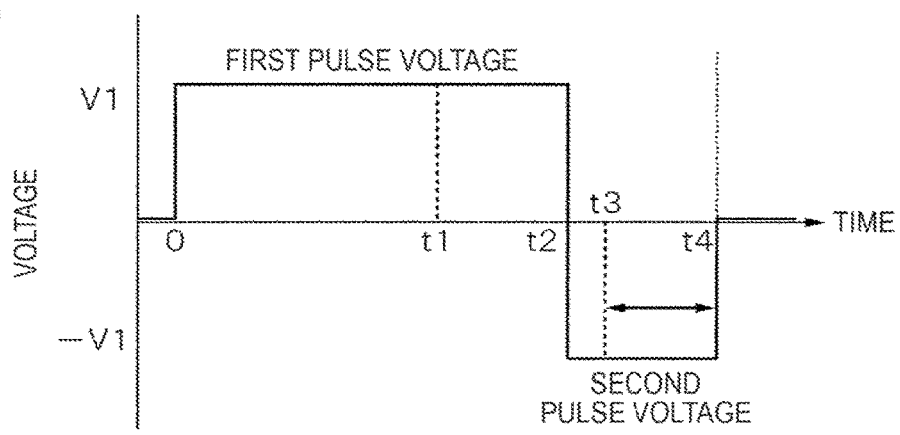
FIG. 17A is a diagram illustrating an example of a driving pulse for displaying the colors of the first particle group and the second particle group in gradation.
Figure 17B:
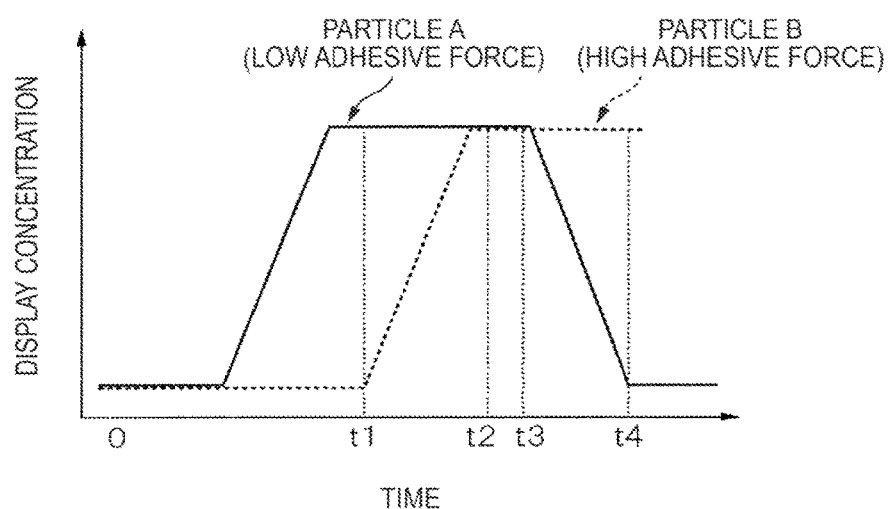
FIG. 17B is a diagram illustrating an example of a change in display concentration with respect to the application time of the driving pulse shown in FIG. 17A.
Figure 17C:
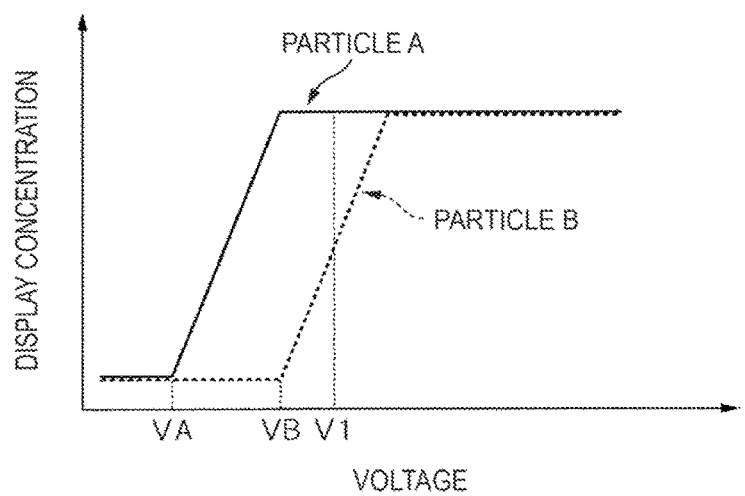
FIG. 17C is a diagram illustrating the relationship between the voltage and display concentration of the particles A and B.

Then, a driving method for displaying the colors of the first particle group 11 and the second particle group 12 in gradation will be described. FIG. 17A is a diagram illustrating an example of a driving pulse for displaying the colors of the first particle group 11 and the second particle group 12 in gradation. FIG. 17B is a diagram illustrating the relationship between display concentration and the application time of the driving pulse shown in FIG. 17A. FIG. 17C is a diagram illustrating the relationship between the voltage and display concentration of the particles A and B.

When the colors of the first particle group 11 and the second particle group 12 are displayed, a first pulse voltage is applied which is a voltage V1 greater than the operation threshold voltage VB (FIG. 17C) of the particle group (the second particle group 12 which is a group of the particles B) with the highest adhesive force among the plural types of particle groups and has a duration $L_{17-1}$ ($t1 \le L_{17-1} \le t2$) (FIGS. 17A and 17B) for which the particle group (second particle group 12) with high adhesive force is separated from the substrate. Then, a second pulse voltage is applied which is a voltage (−V1) having the same absolute value as the first pulse voltage and a different polarity from the first pulse voltage and has a duration $L_{17-2}$ ($t3 - t2 \le L_{17-2} \le t4 - t2$) (FIGS. 17A and 17B) for which the particle group (second particle group 12) with high adhesive force is not separated from the substrate and only the particle group (first particle group 11) with low adhesive force is separated from the substrate.

That is, when the first pulse voltage is applied, the first particle group 11 is separated from the rear substrate 2, moves to the display substrate 1, and is then attached thereto up to a time t1 from the state in which the first particle group 11 and the second particle group 12 are attached to the rear substrate 2. After the time t1, the second particle group 12 is separated from the rear substrate 2, moves to the display substrate 1, and is then attached thereto. In this case, the duration $L_{17-1}$ is adjusted to control the gradation of the color of the second particle group 12.

Then, when the second pulse voltage is applied, only the first particle group 11 is separated from the display substrate 1, moves to the rear substrate 2, and is then attached thereto after a time t3. In this case, the duration $L_{17-2}$ is adjusted to control the gradation of the color of the first particle group 11.

In the above-described embodiment, two types of particle groups are enclosed. However, the number of types of particle groups is not limited to two, but three or more types of particle groups may be provided. In the above-described embodiment, each particle group is attached to the rear substrate 2 in the initial state. However, each particle group may be attached to the display substrate 1 in the initial state.

A driving method when three types of particle groups are provided will be described briefly. Hereinafter, a method for driving an image display apparatus which includes, as three types of particle groups, a yellow particle group of particles A that are colored in yellow, a magenta particle group of particles B that are colored in magenta, and a cyan particle group of particles C that are colored in cyan will be described. However, the colors are not limited thereto. In the following description, it is assumed that the particle C has the highest adhesive force, followed by the particle B and the particle A, and the particles A, B, and C are positively charged. Similarly to the above-described embodiment, a case in which the display-side electrode 3 is grounded and a voltage is applied to the rear side electrode 4 will be described.

Figure 18A:
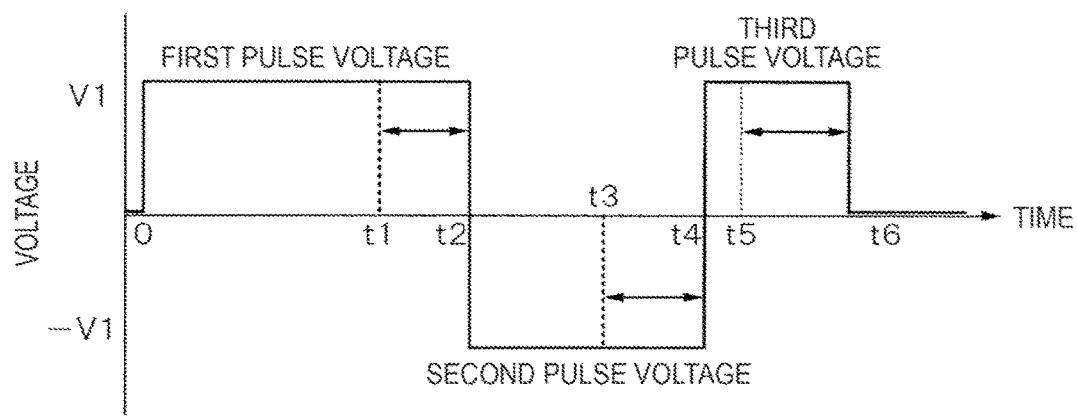
FIG. 18A is a diagram illustrating an example of driving pulses for three types of particles.
Figure 18B:
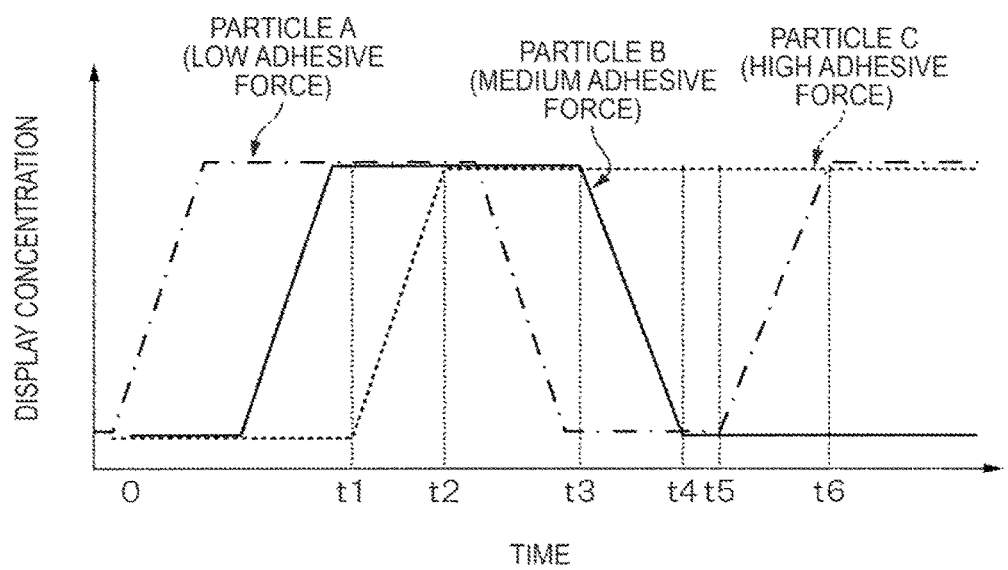
FIG. 18B is a diagram illustrating an example of a change in display concentration with respect to the application time of the driving pulses shown in FIG. 18A.
Figure 18C:
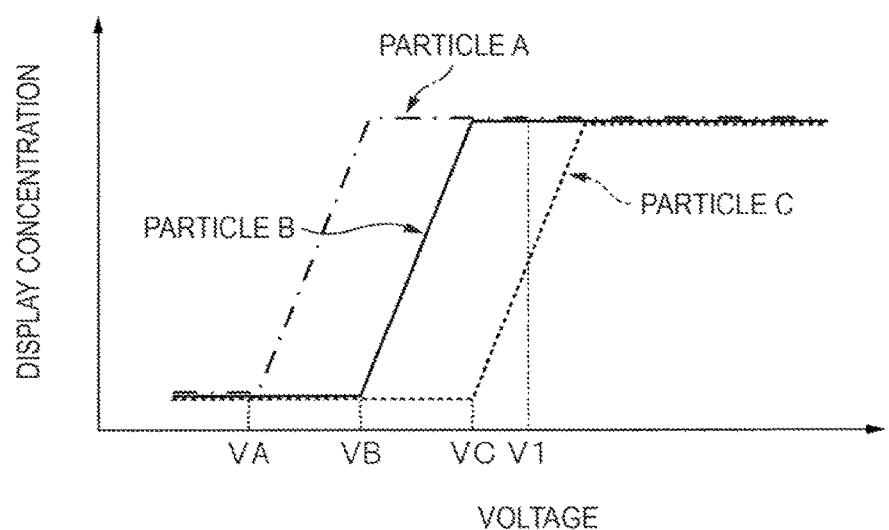
FIG. 18C is a diagram illustrating the relationship between the voltage and display concentration of the particles A, B, and C.

FIG. 18A is a diagram illustrating an example of driving pulses for three types of particles. FIG. 18B is a diagram illustrating an example of a change in display concentration with respect to the application time of the driving pulses shown in FIG. 18A. FIG. 18C is a diagram illustrating the relationship between the voltage and display concentration of the particles A, B, and C.

First, a negative voltage that is equal to or greater than the operation threshold value of the particle C with the highest adhesive force among the plural types of particle groups is applied between the substrates to move all of the particle groups to the rear substrate 2, thereby forming an initial state.

When three types of particle groups are provided, first to third pulse voltages are applied to control the movement of each particle, as shown in FIG. 18A. That is, a voltage V1 which is greater than the operation threshold voltage VC of a particle group (particle C) with the highest adhesive force among the plural types of particle groups and has an application time corresponding to the adhesive force of the particles to be separated from the substrate is applied on the basis of image information. When three types of particle groups are provided, the first to third pulse voltages with different application times can be applied to selectively control the movement of each particle.

Specifically, the first pulse voltage is applied to move some of the particles C with the highest adhesive force (all of the particles A and the particles B are moved). The application time of the first pulse voltage is adjusted between times t1 and t2 shown in FIGS. 18A and 18B to select the gradation of the particles C.

Then, the second pulse voltage is applied to move some of the particles B with the second highest adhesive force (all of the particles A are moved and the particles C are not moved). The application time of the second pulse voltage is adjusted between times t3 and t4 shown in FIGS. 18A and 18B to select the gradation of the particles B.

Then, the third pulse voltage is applied to move some of the particles A with the lowest adhesive force. The application time of the third pulse voltage is adjusted between times t5 and t6 shown in FIGS. 18A and 18B to select the gradation of the particles A.

The following relation is established among the first to third pulse voltages: (the length of the first pulse voltage)>(the length of the second pulse voltage)>(the length of the third pulse voltage). The particle A with the highest adhesive force is controlled by the first pulse voltage, the particle B with the second highest adhesive force is controlled by the second pulse voltage, and the particle C with the lowest adhesive force is controlled by the third pulse voltage. That is, the application time of the pulse voltage is controlled such that the particles are sequentially driven in descending order of adhesive force, and an image is displayed on the basis of image information.

Figure 19A:
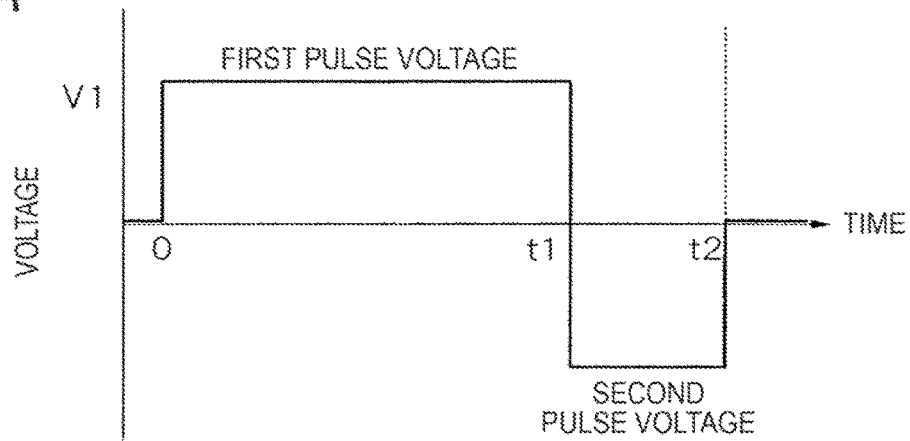
FIG. 19A is a diagram illustrating an example of a driving pulse when the particle A and the particle B have different polarities.
Figure 19B:
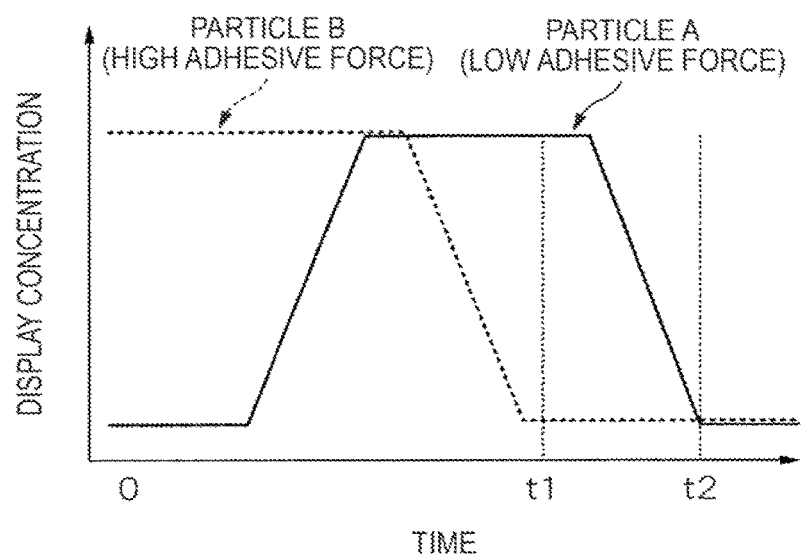
FIG. 19B is a diagram illustrating an example of a change in display concentration with respect to the application time of the driving pulses shown in FIG. 19A.
Figure 19C:
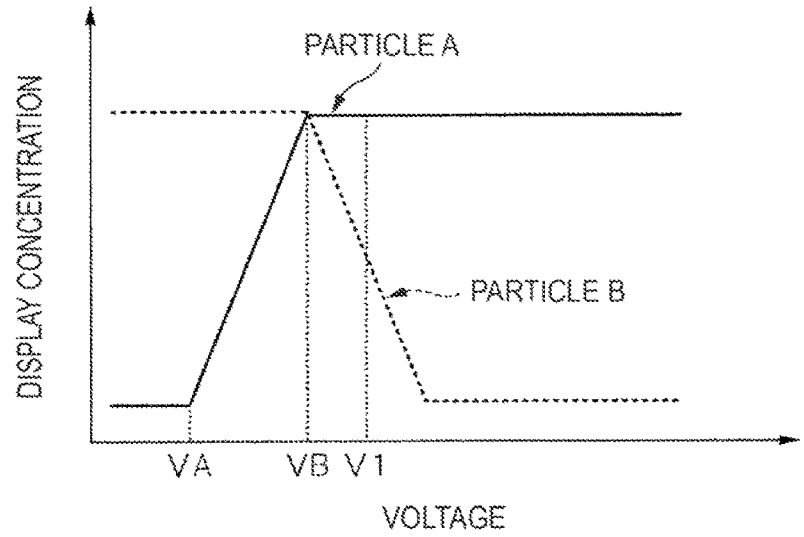
FIG. 19C is a diagram illustrating the relationship between the voltage and display concentration of the particles A and B when the particle A and the particle B have different polarities.

In the above-described embodiment, plural types of particle groups are charged with the same polarity. However, the plural types of particle groups are not limited to the same polarity, but may be changed with opposite polarities. The plural types of particles can be selectively moved as long as they have the same voltage application time and the characteristics that plural particles are not moved. For example, FIG. 19 shows an example in which the second particle group 12 of the particles B has a polarity opposite to that in the example shown in FIG. 11 (is negatively charged). In the example shown in FIG. 19, a first pulse voltage is applied which is a voltage V1 greater than the operation threshold voltage VB (FIG. 19C) of a particle group (the second particle group 12 which is a group of the particles B) with the highest adhesive force among plural types of particle groups and has a duration t1 (FIGS. 19A and 19B) for which a particle group (second particle group 12) with high adhesive force is separated from the substrate. Then, a second pulse voltage is applied which is a voltage −V1 having the same absolute value as the first pulse voltage and a different polarity from the first pulse voltage and has a duration (t2−t1) (FIGS. 19A and 19B) for which the particle group (second particle group 12) with high adhesive force is not separated from the substrate and only a particle group (first particle group 11) with low adhesive force is separated from the substrate.

Figure 20A:
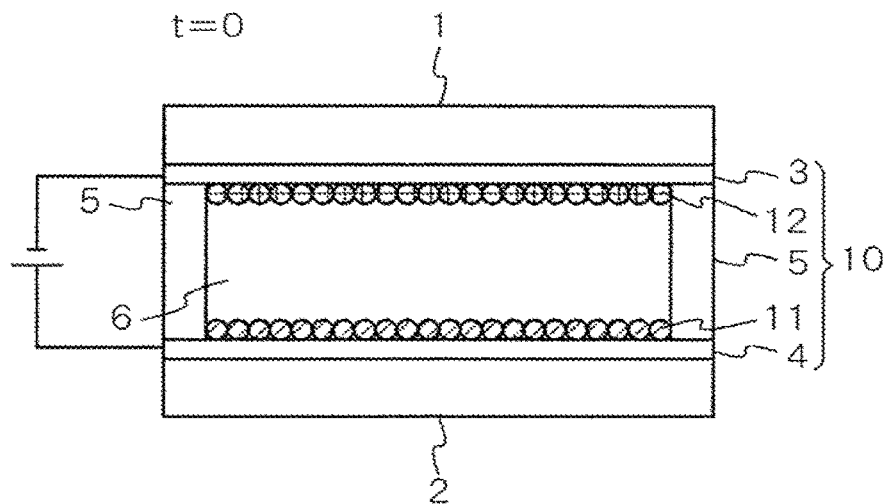
FIG. 20A is a diagram illustrating an initial state in which the first particle group is attached to the rear substrate and the second particle group is attached to the display substrate.
Figure 20B:
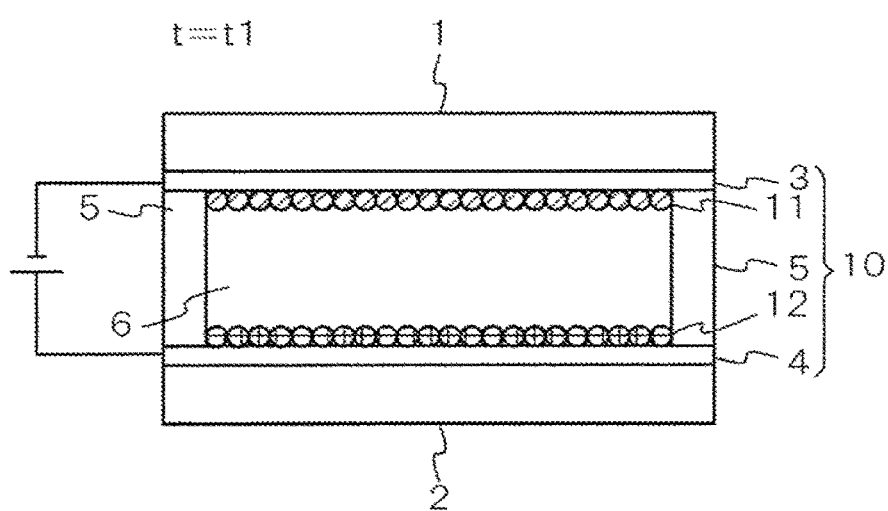
FIG. 20B is a diagram illustrating a state in which the first particle group is attached to the display substrate and the second particle group is attached to the rear substrate.

That is, when the first pulse voltage is applied, in a state in which the first particle group 11 is attached to the rear substrate 2 and the second particle 12 is attached to the display substrate 1 (FIG. 20A), both the first particle group 11 and the second particle group 12 are separated from the substrates, move to the opposite substrates, and are then attached thereto, as shown in FIG. 20B (the first particle group 11 is separated from the rear substrate 2, moves to the display substrate 1, and is then attached thereto and the second particle group 12 is separated from the display substrate 11, moves to the rear substrate 2, and is then attached thereto).

Figure 20C:
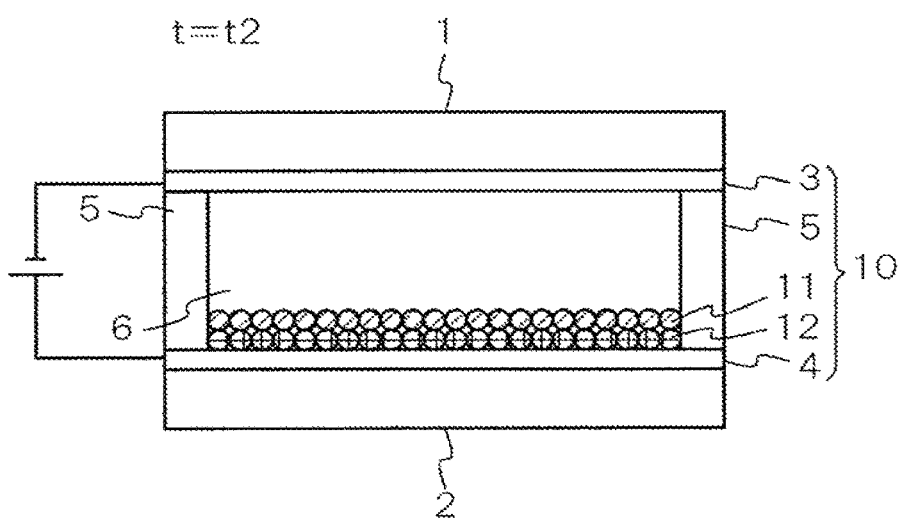
FIG. 20C is a diagram illustrating a state in which the first particle group and the second particle are attached to the rear substrate.

Then, when the second pulse voltage is applied, as shown in FIG. 20C, the first particle group 11 is separated from the display substrate 1, moves to the rear substrate 2, and is then attached thereto. Therefore, both the first particle group 11 and the second particle group 12 are attached to the rear substrate 2. As a result, either no image is displayed or the color of the dispersion medium 6 is displayed when the dispersion medium 6 is colored.

When the image display apparatus according to this embodiment is driven, a reset pulse which attaches each particle group to a predetermined substrate (makes the entire surface have a predetermined color) may be applied before the driving pulse. The voltage and duration of the reset pulse may be the same for all pixels or they may vary for each pixel, depending on the previously displayed image.

In the above-described embodiment, a pulse after the second pulse for selecting the amount of moving particles in the particle group with the second highest adhesive force does not necessarily have the same absolute value as the first pulse. Since the pulse having the same absolute value as the first pulse is used, the voltage is constant. Therefore, an inexpensive device with a simple structure is obtained. However, voltages after the second pulse may have different absolute values in order to meet a demand for, for example, an increase in gradation resolution.

In the above-described embodiment, the particle groups may have a concealing property for absorbing wavelength ranges other than a reflection wavelength range. It is preferable to use particles with high transparency which absorb only a specific wavelength range and transmit the other wavelength ranges in order to display a clear image.

The processes performed by the control unit 40 in the above-described embodiment may be implemented by hardware or a software program. In addition, the program may be stored in various types of storage media and then distributed.

INDUSTRIAL APPLICABILITY

The image display medium driving device, the image display apparatus, the driving program, and the computer-readable medium according to the invention are useful to control the display of images on, for example, electronic paper or electronic books.

The invention has been described in detail above with reference to a specific embodiment. However, it will be understood by those skilled in the art that various modifications and changes of the invention can be made without departing from the spirit and scope of the invention.

REFERENCE SIGNS LIST

1: DISPLAY SUBSTRATE
2: REAR SUBSTRATE
3: DISPLAY-SIDE ELECTRODE
4: REAR SIDE ELECTRODE
10: IMAGE DISPLAY MEDIUM
11: FIRST PARTICLE GROUP
12: SECOND PARTICLE GROUP
20: DRIVING DEVICE
30: VOLTAGE APPLICATION UNIT
40: CONTROL UNIT
100: IMAGE DISPLAY APPARATUS

We claim:

1. A method of driving an image display apparatus containing an image display medium including plural types of particles sealed between a first and second substrate, each type of particles having a color and an adhesive force for maintaining attachment to the substrates, the method comprising:
applying a voltage between the first and second substrates using a voltage application unit for a time equal to or greater than a first separation start time of a first type of particles to initiate separation of the first type of particles from the first substrate,
wherein the first separation start time is less than a second separation start time of a second type of particles, and
wherein each of the types of particles has a separation time distribution equal to a percentage of each of the type of particles that separates from the first substrate over time during application of the voltage.

2. The method of claim 1, wherein the voltage is applied for a duration to cause a portion (A) % of the first type of particles to separate from the first substrate, wherein the portion (A) % is greater than 50%.

3. The method of claim 2, wherein the duration is less than the time needed to cause (100-A) % of the second type of particles to separate from the first substrate.

4. The method of claim 1, wherein the voltage is applied for a duration to cause all of the first type of particles to separate from the first substrate.

5. The method of claim 1, wherein the voltage is applied for a duration to cause all of the types of particles to separate from the first substrate and attach to the second substrate.

6. The method of claim 5 further comprising the step of reversing the polarity of the voltage and applying the voltage between the first and second substrates until at least a portion of the first type of particles separates from the second substrate.

7. The method of claim 1,
wherein the first type of particles has an average particle diameter greater than an average particle diameter of the second type of particles, and
a product of the average diameter and charge density of the first type of particles is greater than a product of the average diameter and charge density of the second type of particles.

8. The method of claim 1, wherein a control unit controls the voltage application unit such that the time when the voltage is applied between the first and second substrates varies depending on image information.

9. The method of claim 8, wherein the control unit is a computer and the voltage is applied according to a driving program stored in a non-transitory medium read by the computer.

* * * * *